United States Patent [19]

Gibson

[11] Patent Number: 5,155,820
[45] Date of Patent: Oct. 13, 1992

[54] INSTRUCTION FORMAT WITH DESIGNATIONS FOR OPERAND LENGTHS OF BYTE, HALF WORD, WORD, OR DOUBLE WORD ENCODED IN ADDRESS BITS

[76] Inventor: Glenn A. Gibson, 4824 Ballerina, El Paso, Tex. 79922

[21] Appl. No.: 313,704

[22] Filed: Feb. 21, 1989

[51] Int. Cl.⁵ .............................................. G06F 9/30
[52] U.S. Cl. ............................... 395/375; 364/942.8; 364/946.2; 364/946.9; 364/DIG. 2
[58] Field of Search ... 364/200 MS File, 900 MS File; 395/375

[56] References Cited

U.S. PATENT DOCUMENTS

| | | | |
|---|---|---|---|
| 4,037,213 | 7/1977 | Atkins et al. | 364/200 |
| 4,109,310 | 8/1978 | England et al. | 364/200 |
| 4,135,242 | 1/1979 | Ward et al. | 395/775 |
| 4,292,667 | 9/1981 | Catiller et al. | 364/200 |
| 4,395,758 | 7/1983 | Helenius et al. | |
| 4,631,667 | 12/1986 | Zulian et al. | 364/200 |
| 4,633,434 | 12/1986 | Scheuneman | 364/900 |
| 4,639,886 | 1/1987 | Hashimoto et al. | 364/200 |
| 4,654,781 | 3/1987 | Schwartz et al. | 364/200 |
| 4,713,749 | 12/1987 | Magar et al. | 364/200 |
| 4,722,052 | 1/1988 | Scheuneman | 364/200 |
| 4,760,525 | 7/1988 | Webb | 364/200 |
| 4,809,169 | 2/1989 | Safarti et al. | 364/200 |
| 4,809,171 | 2/1989 | Dozier et al. | 364/200 |
| 4,811,208 | 3/1989 | Meyers et al. | 364/200 |
| 4,811,214 | 3/1989 | Nosenchuck et al. | 364/200 |
| 4,821,265 | 4/1989 | Albal et al. | 370/94.1 |
| 4,873,630 | 10/1989 | Rusterholz et al. | 364/200 |
| 4,945,479 | 7/1990 | Rusterholz et al. | 364/200 |
| 4,958,275 | 9/1990 | Yokouchi | 364/200 |
| 4,979,096 | 12/1990 | Ueda et al. | 364/200 |
| 4,987,529 | 1/1991 | Craft et al. | 364/200 |

Primary Examiner—Thomas C. Lee
Assistant Examiner—William M. Treat
Attorney, Agent, or Firm—James R. Young

[57] ABSTRACT

A set of processors and instruction set for a pipelined multiprocessing architecture with separate code and data streams is disclosed. The overall architecture considered interlocks instruction execution with the destination transfer of results and includes automated input and output of array data. The data is dispensed from a central memory that is associated with the control unit and all results and inputs are automatically returned to this central memory over a second bus. Once the processors receive their data they operate independently and several instructions may be in the process of being executed at the same time with destination validity checking being used to coordinate the activity. The central memory may contain partitions, called circular partitions, or first-in/first-out buffers which make it possible for it to automatically prefetch or output array data. The instructions include overlapping address and operand length bits.

1 Claim, 11 Drawing Sheets

INSTRUCTION FORMAT WITH DESIGNATIONS FOR OPERAND LENGTHS OF BYTE, HALF WORD, WORD, OR DOUBLE WORD ENCODED IN ADDRESS BITS

CROSS-REFERENCE TO RELATED COPENDING APPLICATIONS

The following copending applications relate to the present application and are incorporated herein by reference:

(A) "Rules and Apparatus for a Code RAM that Buffers Prefetched Instruction Sequences", invented by Glenn A. Gibson (filed Jan. 19, 1988, as application Ser. No. 07/144,948) now U.S. Pat. No. 4,876,642 issued Oct. 24, 1989.

(B) "Rules and Apparatus for a Windowed Programmable Data Buffer that Buffers Prefetched Data", by Glenn A. Gibson (filed Sept. 1, 1988, as application Ser. No. 07/239,510, now abandoned in favor of CIP application Ser. No. 07/277,415, filed Nov. 29, 1988) now U.S. Pat. No. 5,003,471 issued Mar. 26, 1991.

(C) "Rules and Apparatus for an Intermediate Code Memory that Buffers Code Segments", invented by Glenn A. Gibson (filed Oct. 17, 1999 as application Ser. No. 07/258,843, now U.S. Pat. No. 4,914,584 issued Apr. 3, 1990.

(D) "Automated Multiflow Data Buffer", invented by Glenn A. Gibson, filed concurrently with this application.

BACKGROUND OF THE INVENTION

The invention disclosed broadly relates to data processing systems and more particularly relates to processing elements within a data processing system. Even more particularly, the invention relates to the instruction execution mechanisms of such processors and the data handling associated with these mechanisms.

Present day computers are machines that accept instructions and data and produce results from the data according to their instructions. They are made up of elements that communicate with the external world, store data, change the forms of the data, and convert their instructions (which are moved around within the computer as data) into the signals that control the computer's activity. This invention is concerned with those components of the computer, called processing units or elements, that actually carry out the computations. A processing element is typically constructed of one or more circuits that convert the instructions into control signals and perform certain computations, one or more memory circuits for temporarily storing the data to be operated on and the results, and the communications links, or buses, capable of communicating data, instructions, and results between the processing and memory circuits. The present invention consists of an arrangement for connecting the various processing and memory circuits together and a set of instructions for the resulting processor.

When configuring a processing element, the most important attributes to be considered are its processing speed, its versatility, and its overall cost. The present invention is designed so that it is partitioned in such a way that very fast technologies can be used to implement its critical parts and the overall processing element can be customized according to the application. Although speed was the primary design criterion used in formulating this invention, it achieves a good speed to cost ratio by using relatively simple circuits and connections between these circuits. It is the simplicity of the circuits that allows them to be implemented using low-density, but very fast technologies such as those based on gallium arsenide. The architecture contains only two primary internal buses so that, even though the processing element may include several integrated circuits, the power dissipation is kept at a reasonable level. Each integrated circuit would be required to drive only one of these buses and the width and speed of these buses could be set according to the design requirements.

The invention is comprised of a control unit and a very high speed register set/data RAM combination which constitutes its central memory. The control unit receives its instructions from a code stream and uses the instructions to transfer data from the central memory to a parallel set of processing circuits over an output bus. The processing circuits also receive from the control unit that portion of the instructions that indicates which processing circuit is to perform the computation and the precise form of the computation. The selected processing circuit acts as a simple transponder that inputs the data, performs its computation and returns its result(s) to the central memory via an input bus. The instruction execution is coordinated with the arrival of results using a destination validation scheme similar to the scheme often referred to as scoreboarding (see Richard Y. Kain, *Computer Architecture: Hardware and Software*, Vol. 2, Addison-Wesley, 1989, pp. 236–237). Scoreboarding attaches a valid bit to each data location in the local store of the processor. The present invention, however, retains the destination addresses of data in the local store of the control unit until the corresponding results are returned by the processing circuits. The present invention does use valid bits on the destination addresses to denote when the destination address is being used by a processing circuit, but it does not have a valid bit associated with each local store address.

In addition, most processing elements are such that they must use an explicit instruction to load a datum into or store a datum from their internal memories. The present invention allows for the automatic inputting and outputting of sequential data to and from its central memory. This is done by using partitions and, perhaps, first-in/first-out (FIFO) buffers within the central memory.

The overall architecture of the present invention is similar to that of the invention described in Trubisky et al, U.S. Pat. No. 4,521,851, issued Jun. 4, 1985 (the '851 patent), but it also differs from the '851 patent in several respects. The '851 patent also uses separate code and data streams, a central memory, multiple processors, and an output bus for sending source operands to the processors and an input bus for returning results. However, the '851 patent uses a conventional data cache for its central memory, includes separate first-in/first-out buffers for temporarily storing the results until they can be returned to the data cache, coordinates the return of the results with the instruction's execution by including a second instruction execution queue that is associated with the result storage circuitry, and does not provide for automatic prefetching and storing of array data. Also, the processors in the '851 patent serv specific purposes, some of which are related to address calculations. Address calculations are not applicable to the present architecture because it uses only the immediate, direct, and register indirect addressing modes. The equivalent of base, index, and virtual addressing is left to external circuitry such as that described in the invention given in patent application (B) of the foregoing list of copending patent applications. The processors indicated in the present invention may serve extremely varied purposes and may be designed to fit a specific application. Communication with the external data memory hierarchy is handled by one of the processors, the I/O processor, instead of a data cache as in the '851 patent. A final observation is that the architecture of the '851 patent must be synchronous. For the invention herein disclosed, because of the simplicity of the control unit/central memory design and the subdivision separating this circuitry from the processors, it is possible to use either a synchronous or an asynchronous design for of the components—the control unit, the central memory, or any or all of the processors. The use of asynchronous circuitry is highly desirable when designing very high speed circuitry.

SUMMARY OF THE INVENTION

It is the object of this invention to provide a simple processing unit or processing element architecture that can be partitioned so that it can be implemented at a relatively low cost using very fast technologies and in such a way that it can be customized according to an application.

It is another object of this invention to use parallel processing, through the use of both pipelining to overlap instruction execution and multiprocessing to permit simultaneous and independent instruction execution, to attain high computational speeds.

It is another object of this invention to simplify the communication between it and the processing circuits it utilizes by designing the processing circuits as transponders and retaining the destination addresses in the control unit.

It is another object of this invention to coordinate the instruction execution with the return of results by performing destination validity checks using destination addresses as opposed to valid bits that are associated with the central memory locations. This allows the retention of the destination addresses to be combined with the validity checking.

It is yet another object of this invention to provide for automatically inputting sequential data into and outputting sequential data from the processing element's central memory. This allows array data to be prefetched or stored without the use of an explicit instruction for each datum.

Another object of this invention is to allow the use of the low order address bits of the operands in the instructions to define the length of the operands.

A further object of the present invention is to allow the use of bits within each instruction of a particular type to select one of a plurality of sub processing elements which is capable of executing the instruction.

Still another object is to provide instruction processors capable of performing sum of squares operations, sum of products operations, product of sums operations, and a series of consecutive products operations without returning a result to the central memory.

It is still another object of this invention to specify an instruction set for the aforementioned architecture.

The present invention defines an architecture that consists of a control unit, a central memory, a set of parallel processing circuits, called processors, and an output bus and an input bus for providing the necessary communication. The control unit receives the instructions and partially decodes them so that it can direct the outputting of the source operands from and inputting of the results to the central memory. A portion of each instruction is passed on to the processors and is used to select the processor to be used and specify precisely what computation is to be performed. Upon receiving an instruction, a processor inputs the data that is sent to it over the output bus from the central memory and outputs its result(s) to the input bus which conveys the result(s) to the central memory. One of the processors, the I/O processor, is charged with handling all communications with the external data memory hierarchy.

The control unit includes the circuitry for arbitrating the usage of the input bus and retaining the central memory destination addresses until the corresponding results are returned from the processors. Instruction execution can continue and can be overlapped until:

(1) The processor needed to execute the computation or output the data, temporarily cannot accept the source operands.
(2) A source operand address is encountered that is the same as that of a pending result or input datum.
(3) A branch instruction whose branch decision depends on the outcome of previous instructions must wait for those previous instructions to be completed.

In any of these cases, the execution of the present instruction is suspended until the state causing the suspension is cleared (i.e., the needed processor becomes ready to accept operands, the needed result or input datum is put in its destination, or the required previous instructions have been completed). The first case is enforced by ready signals from the processors to the control unit, the second case by comparing source operand addresses to the destination addresses of the instructions currently being executed, and the third case by forcing instructions involving conditional branches to wait until the condition flags have been set by the previous instructions.

The length of the operands of each instruction is determined partially by the low order address bits of the operand address. If the operand does not address a byte operand, the low order bit is not needed to address any datum larger than a byte, so this bit is used to determine if the operand addresses a half-word. If the operand does not address a half-word, the next low order address bit determines if it addresses a word or doubleword.

Some of the instruction processors have multiple sub instruction processors within them, and bits in the instruction select which of the multiple sub instruction processors will be used to execute each particular instruction.

BRIEF DESCRIPTION OF THE DRAWINGS

A better understanding of the present invention may be had from the following description of the preferred embodiment when read in the light of the accompanying drawings whose descriptions are.

DESCRIPTION OF THE PREFERRED EMBODIMENT

The following description is of the best presently contemplated mode of implementing the present invention. This description is not to be taken in a limiting sense, but is made for the purpose of describing the general principles of the invention. The scope of the invention should be determined with reference to the appended claims.

Figure 1:
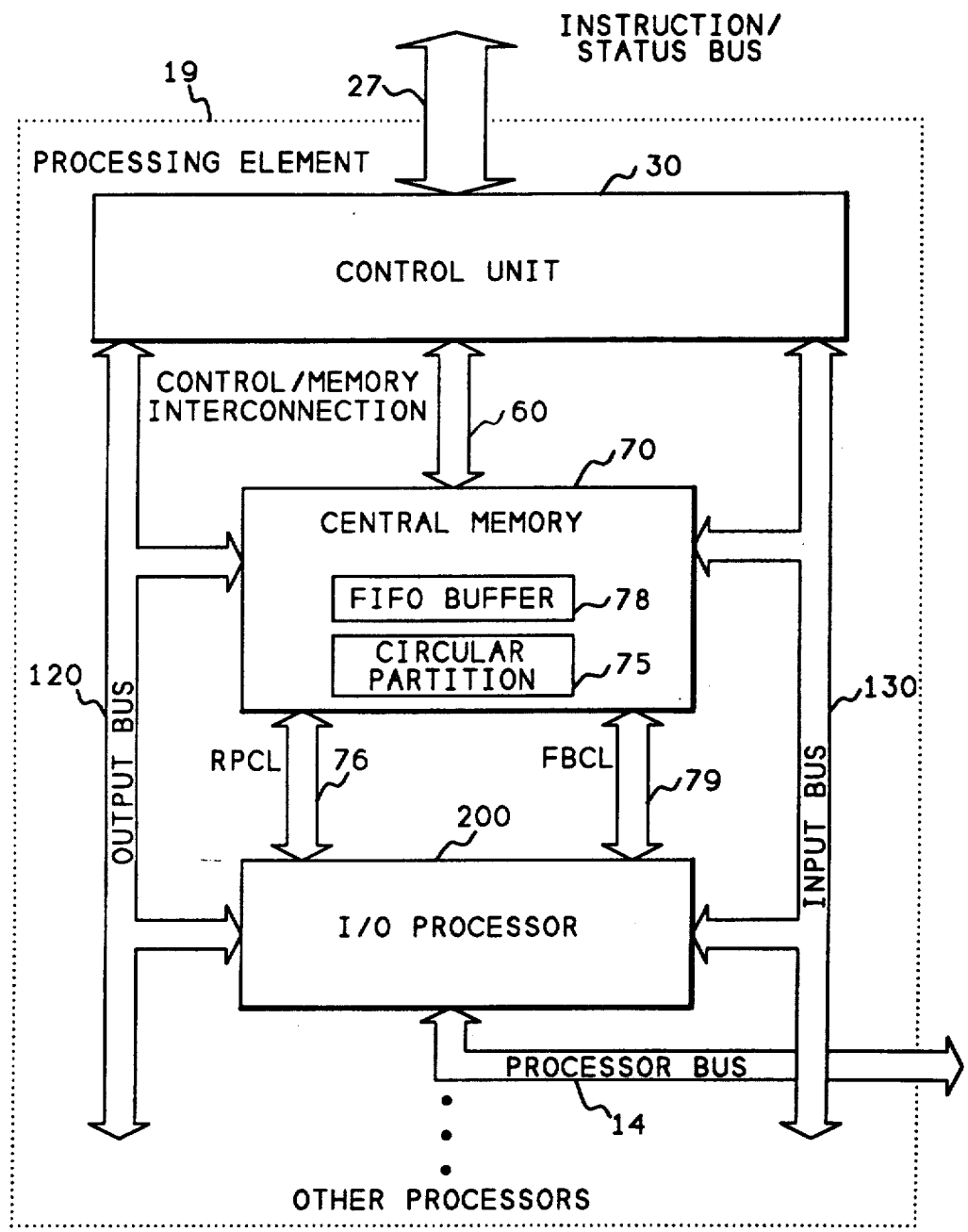
FIG. 1 shows the overall architecture of the processing element described in the present invention.

In FIG. 1 the overall architecture related to the present invention, the Processing Element 19, is illustrated. This architecture is such that the instructions are input to and the status is output from the Processing Element 19 over the Instruction/status Bus 27, and the data is input to and output from the Processing Element 19 over the Processor Bus (PB) 14. The major components o the Processing Element 19 are the Control Unit 30 that controls the activity within the Processing Element 19, the Central Memory 70 that provides for temporary data storage, the Input/output (I/O) Processor 200 that handles all I/O between the Processing Element 19 and the external data memory hierarchy, a set of other processors that perform the computations, an Output Bus 120 that transfers source operands from the Central Memory 70 to the I/O Processor 200 and other processors, and the Input Bus 130 that transfers input from the I/O Processor 200 and results from the other processors to the Central Memory 70.

The Central Memory 70 is primarily a buffer that is used by the Control Unit 30 as it directs the flow of data from and to the I/O Processor 200 and other processors according to the instructions it receives from the code stream. Data is brought into the Processing Element 19 by the I/O Processor 200 via the PB 14 and transferred to the Central Memory 70 via the Input Bus 130. Once the data is in the Central Memory 70 the instructions arriving at the Control Unit 30 via the Instruction/status Bus 27 may cause the data to be directed to the various other processors over the Output Bus 10 and be used as source operands by the other processors. The results may then be directed, according to the instructions, to be returned to the Central Memory 70 over the Input Bus 130. These results may be used by succeeding instructions as source operands in further computations. Thus the contents of the Central Memory 70 may be cycled through the other processors and back into the Central Memory 70 as many times as required to complete a needed computation. At any time an instruction may direct data in the Central Memory 70 to be transferred to the I/O Processor 200 which would then output the data to external memory via PB 14. This implies a circular flow of data in which the data enters through the I/O Processor 200, circulates around within the Processing Element 19 while it is transformed by various computations, and then exits through the I/O Processor 200. The inputting, circulating, and outputting are under direction of the Control Unit 30 and the Central Memory 70 provides the buffering.

The instructions entering the Control Unit 30 may be inline or may come from subprogram instruction sequences. However, if subprograms are used there must be some means of storing and retrieving return addresses. This could be done by using either a last-in/first-out (LIFO) stack that is internal to the Processing Element 19 or a LIFO stack that is maintained in the external data memory. The preferred embodiment assumes that the instruction sequence is inline when it arrives at the Control Unit 30, but other designs that include the concepts of this invention may be derived that have the Control Unit 30 execute subprogram calls and returns.

The preferred embodiment also assumes that the code and data streams are separate. However, the Instruction/status Bus 27 and the PB 14 could be combined into a single bus which is used to transfer both code and data.

Instruction execution may proceed until a needed processor cannot accept its source operands, needed source operands are to be taken from Central Memory 70 locations that are awaiting results, or, for conditional branch instructions, the flags needed to make the decision have not yet been set according to previous instructions. If a location in the Central Memory 70 is the destination of a result or input datum but the result or input datum has not yet been put into the location, then the location is said to be invalid. Otherwise, the location is said to be valid. The indication (directly or indirectly) of the address of a destination operand by an instruction causes the corresponding location to become invalid and the arrival of a result or input datum at an invalid location causes it to become valid. Also, a location that is to be output from next by the automated input/output facility (discussed below) becomes invalid when output from the automated facility becomes blocked and becomes valid when this output becomes unblocked. The execution of an instruction may proceed by having the Control Unit 30:

(1) Indicate to the processors that an instruction has been output and note whether or not there is a first source operand. If there is, execution proceeds with step (2); otherwise execution proceeds with step (9).

(2) Note whether or not the first source operand is not immediate (i.e., not contained in the instruction). If it is not immediate, execution proceeds with step (3); otherwise execution proceeds with step (4).

(3) Determine whether or not the first source operand refers to an invalid location. If it does, execution must wait until the location becomes valid.

(4) Output the first source operand and wait for it to be accepted by the processor designated in the instruction's operation code.

(5) Note whether or not there is a second source operand. If there is, execution proceeds with step (6); otherwise execution proceeds with step (9).

(6) Note whether or not the second operand is not immediate. If it is not immediate, execution proceeds with step (7); otherwise execution proceeds with step (8).

(7) Determine whether or not the second source operand refers to an invalid location. If it does, execution must wait until the location becomes valid.

(8) Output the second source operand and wait for it to be accepted by the processor designated by the instruction's operation code.

(9) Note whether or not there is a destination operand (i.e., result or input operand). If there is, its address is to be stored in the Control Unit 30 and the corresponding location becomes invalid.

(10) Note whether or not the instruction includes a conditional branch. If it does, execution waits until all flags involved in the branch decision have been properly set according to the previous instructions.

(11) Set the necessary Instruction/status Bus 27 control signals and output a present instruction complete signal over the Instruction/status Bus 27.

Some of the above steps may be overlapped. For example, by including a buffer register in the output of Central Memory 70, accessing a second source operand could be done while the first operand is being output over the Output Bus 120.

FIG. 1 also includes a subset of locations in the Central Memory 70 that is referred to as a Circular partition (CP) 75 and is used to provide automated input to and output from the Central Memory 70. The concept of circular partitions is detailed in patent application (D) of the foregoing list of copending patent applications. The locations in the CP 75 have consecutive addresses and are treated as a circular memory with the location having the lowest address being considered to be adjacent to and following the location with the highest address. The circular partition has associated with it a pair of address pointer locations, called its rotating pair, which contain addresses of locations within the circular partition. The rotating pair may be implemented as locations in the Central Memory 70 or may be separate registers. The logic surrounding the rotating pair that is used to control the inputting to and outputting from the CP 75 is called the rotating pair logic (RPL). The contents of the location in the rotating pair used to input the next datum into the CP 75 is called the input pointer and the contents of the other location in the rotating pair is used to output the next datum from the CP 75 and is called the output pointer.

Each of the pointers in the rotating pair is such that it autoincrements after each time it is used to supply an address in the CP 75. This autoincrementing is done such that if the addresses in the CP 75 are N through $N+p-1$, $N+i$ is the address currently contained in the pointer, and $n>0$ is the increment amount, then the next value of the pointer is $N+(i+n)$ modulo p. Also, an address that is incremented from $N+i$ to $N+(i+n)$ modulo p is said to increment past an address $N+j$ if $j=(i+k)$ modulo p for any k such that $0 \leq k < n$.

A pointer in the rotating pair is said to be unblocked if it can be used to address a location in the CP 75; otherwise it is blocked. Because a pointer only increments after it is used for addressing, it must be unblocked before it can be incremented. Conversely, if a pointer is unblocked it can be incremented because it can be used for addressing. The input and output pointers in the rotating pair must obey the following rules:

(1) The input pointer must initially be in its unblocked state and the output pointer must initially be in its blocked state if it is equal to the input pointer.

(2) If a pointer (say pointer A, which may be either the input pointer or the output pointer) increments to become equal or increments past the other pointer (say pointer B), pointer A becomes blocked, but pointer A becomes unblocked again when pointer B increments past it.

This implies that, except during initialization, a transition from the unblocked state to the blocked state occurs only when a pointer becomes equal to or increments past the other pointer, and a transition back to the unblocked state occurs only when the other pointer increments past it. Because the output pointer cannot be used for addressing when it becomes equal to or increments past the input pointer (i.e., it becomes blocked), outputting from the CP 75 cannot overtake the inputting to the CP 75. Also, because the input pointer cannot be used for addressing when it becomes equal to or increments past the output pointer (i.e., it becomes blocked), inputting cannot be to a location that has not yet been used for output.

The CP 75 is initialized by setting its base (lowest) address and length (although these values may be permanently set by the design) and by setting the initial addresses and increment amounts of the pointers in the rotating pair. Normally the pointers are both initially set to the base address and their increment amounts are set to be the same.

Although only one circular partition is shown in FIG. 1, the Central Memory 70 may include several such partitions and their associated rotating pairs and other logic. The purpose of a circular partition is to provide for a continual flow of data into and out of the Central Memory 70. The data may be input from the input portion of the I/O Processor 200 or the result portion of one of the other processors. The data may be output to the output portion of the I/O Processor 200 or as source operands to the other processors. Although the design described here assumes the addresses in the rotating pairs are autoincremented, a similar design would allow autodecrementing of these addresses instead of or in addition to autoincrementing.

A circular partition may be used to input from or output to any of the processors. However, when the circular partition is used for inputting from external data memory via the I/O Processor 200, the I/O Processor 200 must be able to monitor the rotating pair and determine whether or not the input pointer is blocked. The Rotating Pair Control Lines (RPCL) 76 serve this purpose. The RPCL 76 are also used by the I/O Processor 200 to indicate to the circular partition logic that it is ready to accept an output.

Figure 2:
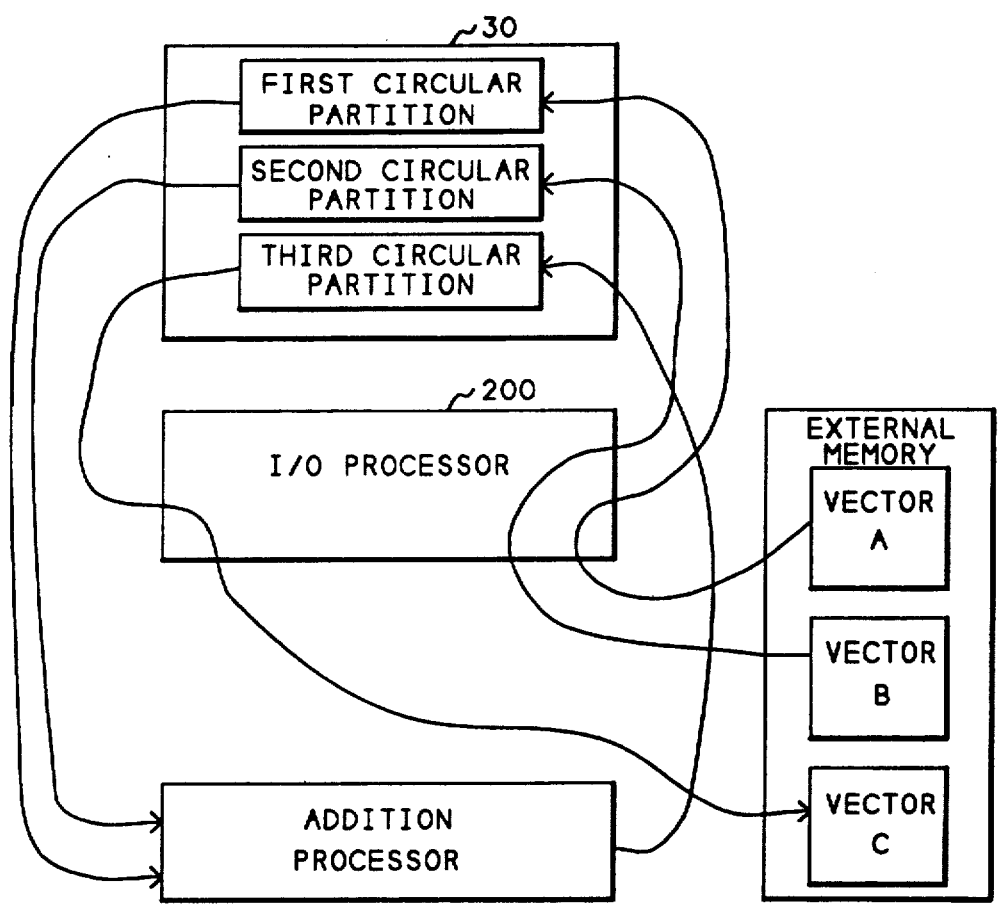
FIG. 2 gives an example of using circular partitions to add long vectors.

An example of the use of circular partitions is shown in FIG. 2. It involves adding two vectors A and B (which may be very long) and putting the result in C. The vectors A and B are assumed to be stored in external memory and vector C is to be put into external memory. One circular partition could be used to input vector A and a second could be used to input vector B. A third could be used to output to vector C. If the I/O Processor 200 is properly initialized to work with the circular partitions it would input A and B into their respective circular partitions. Instructions input to the Control Unit 30 would cause the elements of A and B to be output from their respective circular partitions as source operands and sent to a processor to be added. The results would then be input from the addition processor and put into the third circular partition, from which they would be output by the I/O Processor 200 to the external memory.

The inputting of vector A would be done by the I/O Processor 200 to the locations addressed by the input pointer in the first rotating pair and the inputting of vector B would similarly be to the locations addressed by the input pointer in the second rotating pair. The Control Unit 30 instructions would use the output pointers of these rotating pairs to supply the source operands to the addition processor and the input pointer of the third rotating pair to deposit the results in the third circular partition. The I/O Processor 200 would use the output pointer in the third rotating pair to output the results to external memory. The above stated rules governing the pointers in the rotating pairs would force the elements of A and B to be input before they can be used as source operands and force the results (i.e., the elements of C) to be deposited in the Central Memory 70 before they are considered for output to the external memory. The circular partitions and the I/O Processor 200 would be initialized using suitable Control Unit 30 instructions before the process of adding the vectors A and B begins.

In addition to using circular partitions, FIFO buffers, such as the FIFO Buffer 78 shown in FIG. 1 (and defined in Morris Mano, *Computer Organization*, Prentice-Hall, 2nd ed., 1982, p. 427) could be used for automated input to and output from the Central Memory 70. Both FIFO buffers and circular partitions have the same first-in/first-out effect on the data flow, but with circular partitions the length of the partition and the width of the operand are programmable. For FIFO buffers these quantities are part of the design and are fixed, but the connections to a FIFO buffer are somewhat simpler. The input to a FIFO buffer becomes blocked when the buffer becomes full and becomes unblocked when the buffer becomes not full. The output from a FIFO buffer becomes blocked when the buffer becomes empty and becomes unblocked when a datum is placed in the buffer. As with circular partitions, the I/O Processor 200 communicates with the FIFO buffers and their control logic. This is done by using the FIFO Buffer Control Lines (FBCL) 79. The automated input/output facility may include only circular partitions, only FIFO buffers, or a combination of both.

SPECIFIC CONTROL UNIT/CENTRAL MEMORY LAYOUT

Figure 3:
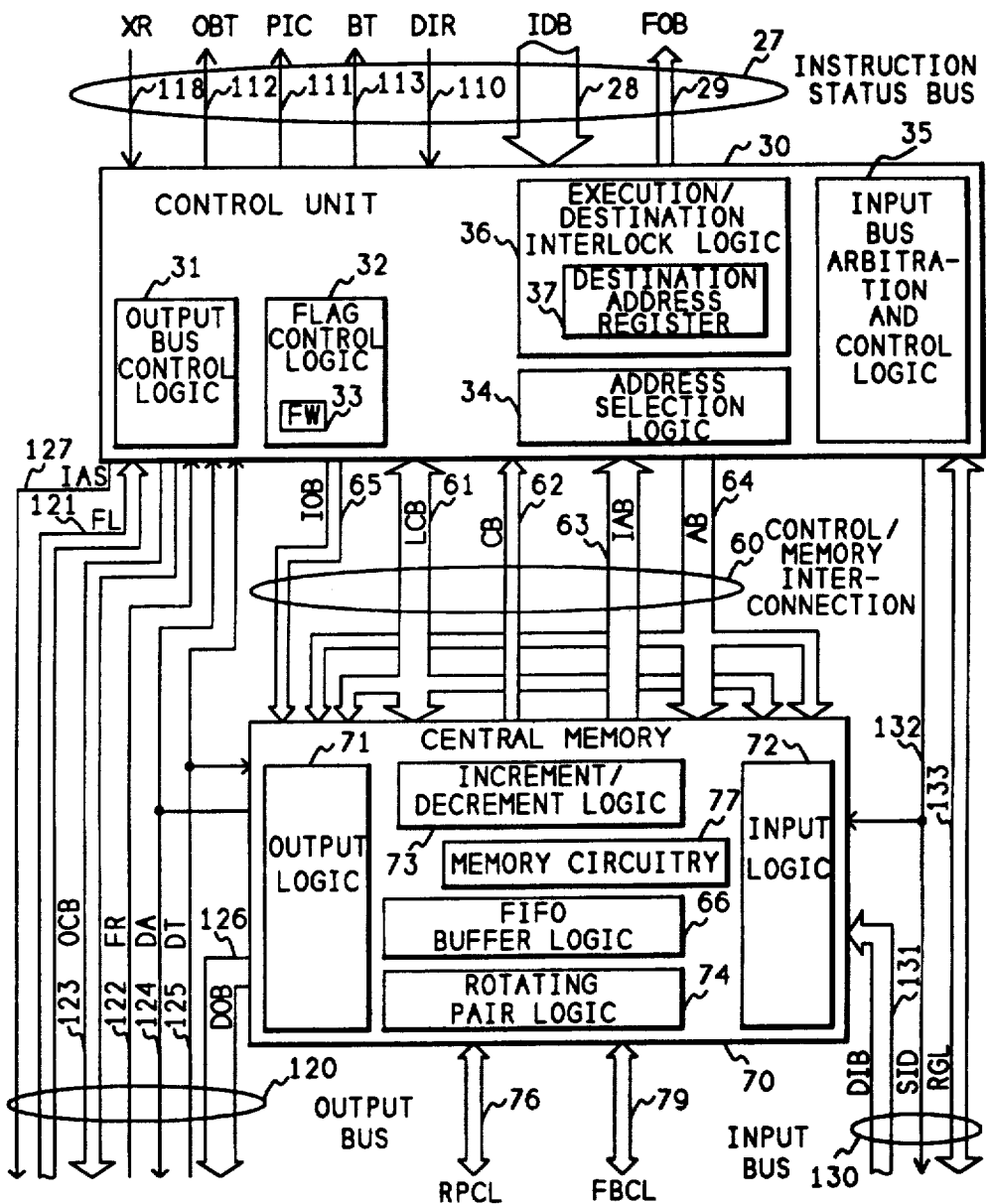
FIG. 3 shows the detailed control unit/central memory connections and the output bus, input bus, and instruction/status bus definitions.

FIG. 3 provides a specific implementation of the Control Unit 30 and Central Memory 70 of the Processing Element 19. The major components of the Control Unit 30 are the:

Output Bus Control Logic (OBCL) 31 which partially controls the activity on the Output Bus 120.

Flag Control Logic (FCL) 32 which updates the condition flags that collectively constitute the Flag Word (FW) 33.

Address Selection Logic (ASL) 34 which supplies the addresses of the locations being accessed in the Central Memory 70. In the case of indirect addressing it may first receive the address from a location in the Central Memory 70.

Input Bus Arbitration and Control Logic (IBACL) 35 which arbitrates the use of the Input Bus 130 by the I/O Processor 200 and the other processors and controls the transfers over the Input Bus 130.

Execution/destination Interlock Logic (EDIL) 36 which stores destination addresses and enforces the coordination of the execution of instructions with the arrival of processor results and input data.

Each processor in the Processing Element 19 may produce one or more results and there is a Destination Address Register (DAR) 37 corresponding to each possible source of these results. (For example, the I/O Processor 200 is designed to control two input data streams, so it includes two sources of results, each of which is associated with a DAR.) When an instruction supplies a result that is to be stored in the Central Memory 70 and the instruction does not use an automated input/output facility (e.g., a FIFO), the address of the result is put into the DAR corresponding to the processor that will process the instruction and the source of the result (if the processor includes more than one such source). At this time it also marks the DAR as invalid, and therefore the locations pointed to by the DAR are invalid. All source operand addresses except those provided by an automated input/output facility are compared to all of the DARs and, if there is a match resulting from any one of the compares, the access to the source operand is suspended until a result is put into the location pointed to by the matching DAR. After receiving the result, the DAR is then marked valid, and the location pointed to by the DAR can be used as a source operand. For data transfers involving circular partitions, the rotating pairs of the circular partitions are used to coordinate the inputting and outputting of data to and from the Central Memory 70. If a FIFO buffer is to be used to supply the source operand, then access will be suspended only if the FIFO buffer is blocked (i.e., the FIFO buffer is empty).

The major components of the Central Memory 70 are:

Memory Circuitry 77 which is the actual storage circuitry.

Output Logic 71 which includes a buffer register and accepts the data output by the Memory Circuitry 77 or the immediate data output by the Control Unit 30 and outputs to the Output Bus 120 in the proper form and sequence.

It, along with the OBCL 31, controls the Output Bus 120.

Input Logic 72 which includes a buffer register and receives data from the Input Bus 130, puts them in the proper format, and stores them into the Memory Circuitry 77.

Rotating Pair Logic (RPL) 774 which includes all of the logic for implementing the circular partition (other than the actual locations which are part of the Memory Circuitry 77). It also communicates with the I/O Processor 200 using signals on the RPCL 76.

FIFO Buffer Logic 66 which includes and controls the FIFO buffers. It also communicates with the I/O Processor 200 using signals on the FBCL 79.

Increment/decrement Logic (IDL) 73 which provides for autoincrementing/autodecrementing those locations in the Central Memory 70 that are used for indirect addressing (such as the rotating pairs) or for counting.

The locations in the Memory Circuitry 77 may be used for storing data, for the indirect addressing of other locations in the Memory Circuitry 77, or for counting.

Autoincrementing/autodecrementing combined with indirect addressing can be used to increment/decrement through arrays of data that are stored in the Memory Circuitry 77 with the autoincrementing/autodecrementing being done by the IDL 73. Indirect addressing is accomplished by having the ASL 34 supply the address of the location containing the needed address to the Memory Circuitry 77. The Central Memory 70 returns the needed address to the ASL 34 which then uses the address to access the location in the Memory Circuitry 77. Use of a circular partition is accomplished by using the pointers in the corresponding rotating pair as the addresses of the operands.

Some locations in the Memory Circuitry 77 may be used for counting. Each time one of these locations is accessed it would autoincrement/autodecrement until a limit is reached, at which time a signal would be sent to the Control Unit 30. When the limit is reached a signal which could be used by certain instructions that include conditional branches, such as loop instructions, would be sent to the Control Unit 30.

When variable length operands are being used, the length must be sent to the Input Logic 72 or Output Logic 71 when operands are being transferred. Also, the length must be sent to the processor involved in the transfer. The length of a result or input may also need to be stored in the DAR along with the destination address. This could be avoided by having the EDIL 36 always assume the maximum length, however this may cause several addressable locations (e.g., bytes) in the memory circuitry 77 to be marked invalid even though a lesser number of locations will actually receive the result.

Some of the low-order address bits also need to be sent to the Output Logic 71 or Input Logic 72 depending on the widths of the Output Bus 120 and the Input Bus 130. The Output Logic 71 is responsible for receiving the data output by the Memory Circuitry 77, selecting the data that is needed by the processor from the data that is output by the Memory Circuitry 77 and transmitting the data (but not necessarily all at once) to the processors over the Output Bus 120. The Input Logic 72 is responsible for receiving results and inputs from a processor via the Input Bus 130, selecting the data that is to be put into the Memory Circuitry 77, and then writing only that data into the Memory Circuitry 77.

For example, the addressable locations in the Memory Circuitry 77 could be one 8-bit byte wide, and the operands could be 1, 2, 4, or 8 bytes long. The Memory Circuitry 77 and Output Logic 71 could be designed so that 8 bytes beginning at an address that is divisible by 8 are transferred out of the Memory Circuitry 77 and into a buffer register in the Output Logic 71 each time the Memory Circuitry 77 is read, regardless of the operand length. The operands could be restricted so that a 1-byte operand could be from any location, but a n-byte operand (n = 2,4,8) could only be from a location whose address is divisible by n. This would cause each read access to contain an entire operand. The Output Logic 71 would select the data that is to be sent to the processor from the 8-byte set of data by using the operand length and the three low-order address bits that are used to address the source operand. If the Output Bus 120 is less than 8 bytes wide it would sometimes be necessary for an operand to be output using more than one bus transfer, in which case the Output Logic 71 would be charged with making the proper number of transfers.

Inputs could be handled similarly, except that the Input Logic 72 would use the length and three low-order address bits to restrict the write into the Memory Circuitry 77 to include only the bytes in the result or input datum.

The major components of the Control/memory Interconnection 60 are the:

Length and Control Bus (LCB) 61 which supplies the operand lengths to the various parts of the Central Memory 70 and includes the control signals needed between the Control Unit 30 and the Central Memory 70.

Count Bus (CB) 62, which contains one line for each location in the Central Memory 70 that is used for counting, is used for signaling the Control Unit 30 when a count has reached its limit.

Indirect Address Bus (IAB) 63 which is used for transferring indirect addresses from the Central Memory 70 to the ASL 34.

Address Bus (AB) 64 which provides the address to the Memory Circuitry 77, Output Logic 71, and Input Logic 72 when the Central Memory 70 is being accessed.

Immediate Operand Bus (IOB) 65 which is used for transferring immediate operands from the Control Unit 30 to the Output Logic 71, from which they can be output to the Output Bus 120.

The major components of the Output Bus 120 are the:

Flag Lines (FL) 121 which transmit the flag values from the processors to the FCL 32 where they are put into the FW 33.

Flags Ready (FR) 122 signal from the processors that indicates that the flags are to be updated, i.e., the signals on the FL 121 are to be latched into the FW 33.

Operation Code Bus (OCB) 123 which transfers the operation code bits from the Control Unit 30 to the processors. Some of these bits identify which processor will accept the source operands and perform the operation.

Data Output Bus (DOB) 126 which is used to output data from the Output Logic 71 to the processor selected by the signals on the OCB 123.

Data Available (DA) 124 signal which is output by the Output Logic 71 and indicates that the Control Unit 30 has put an instruction on the OCB 123 and/or the Output Logic 71 has placed data on the DOB 126.

Data Taken (DT) 125 signal which is output by the processor selected by the OCB 123 to receive the instruction and/or data and indicates that the processor has latched the instruction and/or data from the DOB 126.

The FR 122 signal is such that any processor that sets one or more flags can deactivate it and hold it inactive until the processor has placed its flag signal(s) on the FL 121. The FR 122 signal is activated when all processors currently holding the FR 122 signal inactive have put their flags signals on the FL 121 and have ceased holding the FR 122 signal inactive. An instruction that involves a conditional branch that depends on the flags would not be allowed to proceed to make the branch decision until the FR 122 signal is active. An alternative would be to have a flag ready line corresponding to each of the flag lines in FL 121.

The major components of the Input Bus 130 are the:

Data Input Bus (DIB) 131 which is for transferring data from the processors to the Input Logic 72.

Request/grant Lines (RGL) 133 which are used by the processors to request usage of the DIB 131 and are used by the IBACL 35 to return grants (i.e., permissions to use the DIB 131) to the processors.

Strobe Input Data (SID) 132 signal which is output by the IBACL 35 and causes the data on the DIB 130 to be latched into the Input Logic 72. It also causes the processor supplying the data to drop its output to the DIB 131.

The major components of the Instruction/status Bus 27 are the:

Instruction Decode Bus (IDB) 28 which is for inputting the instructions into the Control Unit 30.

Flags Output Bus (FOB) 29 which is for outputting the contents of the FW 33 and, perhaps, other status information from the Control Unit 30.

Decode Instruction Request (DIR) 110 signal which indicates an instruction has been placed on the IDB 28.

Present Instruction Complete (PIC) 111 signal which indicates that the Control Unit 30 is ready to accept another instruction.

External Reset (XR) 118 which causes the entire Processing Element 19 to be reset. A reset would cause all locations in the Central Memory 70 to become valid, all flags to be cleared, the PIC 111 to become active, and all processors to go to their reset states.

Branch True (BT) 113 signal which is active when the current instruction is an inside branch and the branch condition is true.

Outside Branch True (OBT) 112 signal which is active when the current instruction is an outside branch and the branch condition is true.

The BT 113 and OBT 112 lines permit two types of branches, referred to as inside and outside branches. Other lines could be added if more than two types of branches are needed for a design. The Instruction/status Bus 27 matches the definition of the code buffer given in Patent (A) of the foregoing list of copending patent applications.

SPECIFIC INSTRUCTION SET

Figure 4:
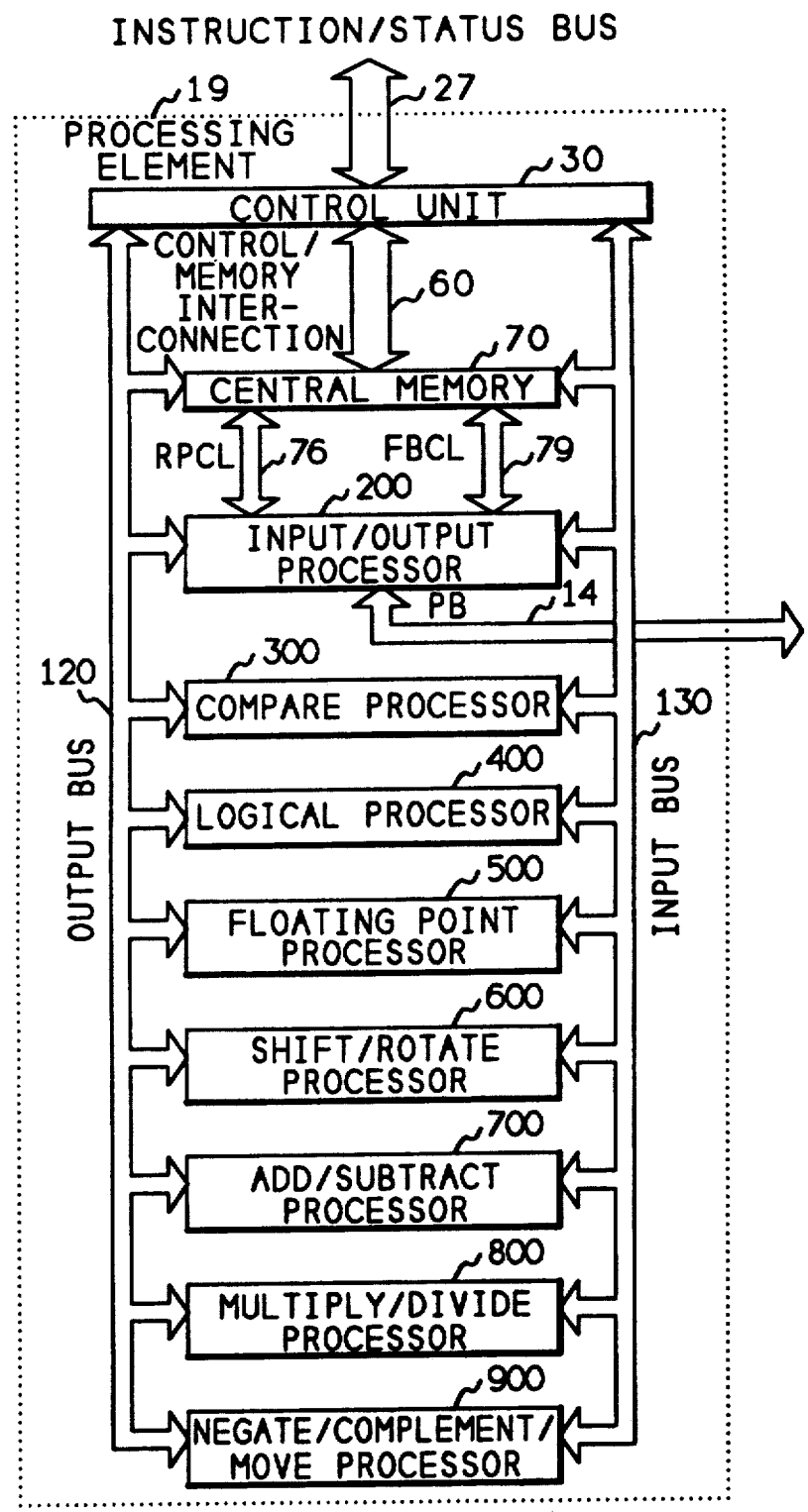
FIG. 4 shows the overall architecture with the specific set of processors defined by the present invention.

The following description is of a specific instruction set for the processing element architecture described above. This instruction set requires the set of processors depicted in FIG. 4. All instructions contain 32 bits that are numbered from 31, which is the high-order bit, through 0, which is the low-order bit. The four high-order bits, 31 through 28, are called the processor identification field (PIF) and indicate the processor to be used to execute the instruction. The instruction-related properties of the processors shown in FIG. 4 are given in TABLE 1. For the C processor the bit combination in bits 30–24 must be non-zero. In addition, there are some instructions that do not use any of the processors and the PIF for these instructions is 0000. The code arriving at the Processing Element 19 is inline and, therefore, the subprogram call and return instructions are not executed by the Processing Element 19, but they, and perhaps other instructions, are executed by other elements external to the Processing Element 19. For all such instructions the bits 31 through 24 are all 0. In addition, there are some instructions that are executed by the Control Unit 30 and are not executed by any of the processors. For these instructions bits 31 through 28 are 0000 and bits 27 through 24 are not 0110, 1000, or 1100.

The operands are one, two, four, or eight 8-bit bytes long and are respectively referred to as byte, halfword, word, and doubleword operands. Floating point operands are either word operands (single precision) or doubleword operands (double precision). If an operand is in the Central Memory 70 and is 2, 4, or 8 bytes long, its address in the Central Memory 70 must be divisible by its length Otherwise an alignment error occurs and the alignment error flag in the FW 33 is set to 1. Except for the load and store instructions, which use the I/O Processor 200 to input data from and output data to an external memory, the operands must be located in the Central Memory 70 or be immediate (i.e., contained in the instruction). Immediate operands are either byte or halfword operands The Central Memory 70 contains 224 1-byte individually addressable locations and its addresses are one byte in length. In addition, it includes four FIFO buffers each of which is eight bytes wide and has an 8-bit address. When accessing a Central Memory 70 location indirect addressing is accomplished by using one of the locations with address 01 through IF to provide the address of the operand. The addresses for accessing external memory are two bytes in length. The only addressing modes that are available are the immediate, direct, and indirect modes.

Because locations 01 through IF are used for indirect addressing, a special instruction, the move/repeat instruction, is needed to put data into these locations. The move/repeat instruction is also used to put data into location 00 even though it is not used for indirect addressing. Except when 01 through IF appears as a destination address in a move/repeat instruction, the occurrence of 01 through 1F in an operand field causes the address of the operand to be obtained from the specified location.

Location 00 is used only for counting and is used only for single instruction repetition (described later). Locations 00 through 07 are autodecremented after each time they are accessed and locations 01 through 07 may be used for either counting (i.e., for looping—described later) or indirect addressing. When used for counting, the decrement amount is always 1. When used for indirect addressing the decrement amount is the operand length. Locations 08 through 0F are used for indirect addressing, but neither autoincrement nor autodecrement when they are accessed. Locations 10 through 17 are used as four rotating paris with each autoincrement by the length of the operand when they are accessed. Locations 18 through 1F are used as four rotating pairs with each pair occupying locations with consecutive even and odd addresses. The high-order three bits of each location in the pair are set when the rotating pair is initialized, but are then held fixed during the use of the rotating pair. This implies that all circular partitions are 32 bytes long and begin at locations that are divisible by 32. The increment amount for a rotating pair is the operand length. The addresses 20, 28, 30, and 38 are associated with the four FIFO buffers which may be used to buffer byte, halfword, word, or doubleword operands.

An instruction may contain 0, 1, 2, or 3 data operand fields. When the operand is immediate the field may be 8 or 16 bits wide and occupy bits 15 through 8 or bits 23 through 8. For direct and indirect addressing the data operand field is eight bits wide with the source operands being indicated by bits 23 through 16 and/or bits 15 through 8 and destination operands being indicated by bits 7 through 0. There are two types of branch instructions. There are inside branch instructions which have 8-bit branch addresses occupying bits 7 through 0 and outside branch instructions which have 16-bit branch addresses occupying bits 15 through 0.

All of the operands in an instruction have the same length and, if the instruction has operands, the length is determined by the following two cases:

- Bit 31=0 (C Processor): Bits 1 and 0 of the location supplying the address and bit 27 of the instruction determine the length if indirect addressing is being used; otherwise bits 17, 16, and 27 of the instruction are used.
- Bit 31=1 (Any other processor): Bits 1 and 0 of the location supplying the address and bit 27 of the instruction determine the length if indirect addressing is used; otherwise bits 1, 0, and 27 of the instruction are used.

Figure 5:
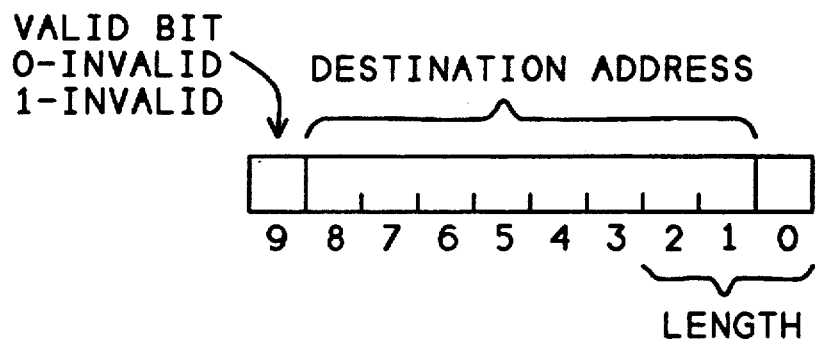
FIG. 5 shows the format of a destination address register.

In either case, if the bit ordering 1-0-27 or 17-16-27 is assumed then --0 indicates a byte operand (where "-" indicates a "don't care" or a low-order bit of an address), -01 indicates a halfword, To enforce the rule that a source operand cannot be taken from a location that is marked invalid and the instruction's execution must be suspended until the location becomes valid, a DAR has been included in the EDIL 36 for each possible source of results (or inputs—inputs are considered to be results). The numbers of DARs for the various processors for the present specific instruction set are given in TABLE 1. The format for a DAR is given in FIG. 5. The high-order bit (bit 9) is the Valid bit and is cleared to 0 when a destination address is put into the DAR, thereby reserving a destination location by indicating that the location pointed to by the DAR is invalid; this bit is set to 1 when the DAR is used to store a result. As indicated by the foregoing rules governing the coordination of instruction execution and the arrival of destination operands, a location must be marked valid before it can be used as a source operand and marked invalid before a result can be stored in it.

The low-order three bits of the DAR indicate the length of the destination operand and/or the low-order two bits of the address of the destination. The low-order bit is set to 0 if the destination operand is a byte and is otherwise a 1. Bits 1 and 0 are 01 if the destination operand is a halfword. Because a halfword must be aligned so that it begins at an address that is divisible by 2, only 7 bits, bits 8 through 2, are needed to specify its address. Similarly, if bits 2, 1, and 0 are 011 then the destination operand is a word and only bits 8 through 3 are used to specify the destination address, and if bits 3, 2, 1, and 0 are 0111 then the destination operand is a doubleword and only bits 8 through 4 are used to specify the destination address. If the destination operand length is n and the destination address is N, then N is divisible by n and the locations N through N+n−1 are all invalid when N is stored in a DAR. Therefore, instruction execution is suspended if a source operand address is encountered that is in the range N through N+n−1. If the destination operand is addressed indirectly, then the address in the instruction is of the location whose contents are used to fill bits 8 through 1 of the DAR. Whether the addressing is direct or indirect, bit 27 of the instruction is used to fill bit 0 of the DAR.

The present specific instruction set includes loop instructions and each loop instruction designates a location with an address in the range 01 through 07. The location is initially filled using a move/repeat instruction and each time the loop instruction is executed the contents of the location are tested. If they are 0 an active signal is sent from the Central Memory 70 to the Control Unit 30 over the CB 62 line that corresponds to the location. This signal being active causes the backward branch to not be taken; otherwise the backward branch is taken. After the contents of the location are tested they are decremented by 1.

The instruction set and Control Unit 30 also allow instructions to be repeated a specified number of times. This is done by putting a count into location 00 using a move/repeat instruction. When a move/repeat instruction has a destination address of 00 a flag, called the repeat flag, is set in the Control Unit 30. When the contents of location 00 are 0, an active signal is sent from the Central Memory 70 to the Control Unit 30 over the CB 62 line corresponding to location 00. While the repeat flag is set, the instruction that immediately follows the move/repeat instruction that set the repeat flag tests this CB 62 line and if it is not active the instruction is executed and the next instruction in sequence is not brought in (i.e., the PIC 111 line is not made active); otherwise the instruction is not executed, the repeat flag is cleared to 0, and the next instruction in sequence is brought in. After the contents of location 00 are tested they are decremented by 1. Therefore, the instruction following the move/repeat instruction that sets the repeat flag is repeated by the count that is initially put into location 00.

Source operands are taken from the instructions (if they are immediate) or from the Central Memory 70 and put onto the Output Bus 120 by the output logic 71. If the Output Logic 71 disassembles the operands for transfer over the Output Bus 120, the processors must reassemble the operands in the corresponding order. Similarly, any disassembly of the result (i.e., destination) operands for transfer over the Input Bus 130 must be correspondingly reassembled by the Input Logic 72. Also, the flags in the FW 33 must be updated by some of the processors as they execute their instructions.

The instruction set is defined in TABLE 2 through TABLE 11 using the following legend of abbreviations, symbol definitions, and bit combination assignments:

---

Do not care = —
Data memory addresses = a (first source), b (second source), c (destination)
Branch address = d
Immediate operand = i
When a source operand may be immediate bit 24 = 0 indicates it is not immediate and bit 24 = 1 indicates it is immediate.
Shift/rotate count = s
Branch condition = rrr

| rrr | Direct | Complement | |
|-----|--------|------------|---|
| 010 | GE (≧) | LT (<) | Unsigned |
| 011 | GE (≧) | LT (<) | Signed |
| 100 | GT (>) | LE (≦) | Unsigned |
| 101 | GT (>) | LE (≦) | Signed |
| 110 | NE (≠) | EQ (=) | Unsigned/signed |

Branch direction = y
  0 - forward
  1 - backward
Flags branch condition = xxxxxxxx
  00000000 - unconditional branch
  00000001 - divide by zero
  00000010 - exponent underflow
  00000100 - exponent overflow
  00001000 - signed integer overflow
  00010000 - zero
  00100000 - carry
  01000000 - illegal operation -continued 10000000 - alignment error
Floating point function code = f
Process number = p
Process type = t
Assembler indicator = ai
I/O address or status register = n TABLE 2 defines the instructions that either are executed by hardware external to the Processing Element 19 or are entirely executed by the Control Unit 30. The instructions executed external to the Processing Element 19 are the subprogram call and return instructions which allow the code stream presented to the Processing Element 19 to be inline, an externally executed unconditional branch called a memory branch, and an instruction for terminating tasks. The instructions executed by the Control Unit 30 are for programmed setting and clearing of the flags in the FW 33, performing no operation, and performing branches. There are two types of branches:

1. Inside branches for which the branch address is relative to the location of the present instruction in the code stream. The instruction includes an 8-bit displacement.
2. Outside branches for which the branch address is included in the instruction as a 16-bit absolute address.

One form of branching is looping. The loop instructions designate a count location (location 01 through 07 of the Central Memory 70) and branch if the contents of that location are non-zero and do not branch if they are 0. There are both inside and outside loop instructions.

The definitions of the instructions executed by the processors are divided into groups, one group per processor, with the assignment of an instruction to a group being determined by the processor used to execute the instruction. The discussion that follows is broken into sections, one section per group and, therefore, one section per processor. Each section refers to one or, in the case of the floating point processor, two tables for defining the instructions and a figure which gives a block diagram of the processor. Each section includes the definitions of the registers and flop-flops that are in the figure and are referred to in the table(s). The tables and figures are designed to simplify the corresponding discussions and may include more registers than are actually needed to implement the operations performed by the processors. The exact register configurations are not important to the present embodiment, but the operations that the processors are capable of performing are important to the embodiment. Implementation of each processor could be based on any one of several well known designs for constructing arithmetic, logical, or I/O processors. What is important is that these processors input operands and output results according to the rules and instructions outlined in this preferred embodiment.

COMPARE PROCESSOR (C) 300

The Compare (C) Processor 300 serves two purposes:
1. It can determine whether or not a branch is to be made by comparing two numbers.
2. It can be used to find the maximum and minimum of a set of numbers.

Figure 6:
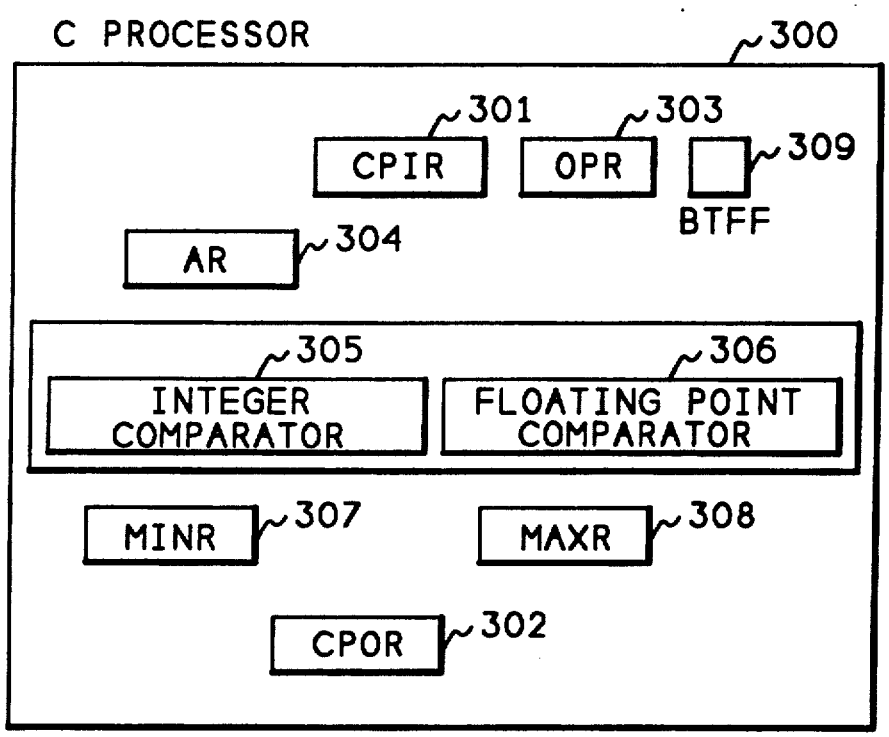
FIG. 6 shows the major components of the compare processor.

The first is satisfied by instructions whose bits 31-28 are 0rrr, where rrr is non-zero, and the second by instructions whose operation codes are 00001000, 00000110, or 00001110. The instructions for the C Processor are defined in TABLE 3 and its principal registers are shown in FIG. 6. The definition of these registers are as follows:

| Name (number) | Abbr. | Definition |
|---|---|---|
| Compare input (301) | CPIR | Where input operands are received and assembled and single input operands or the second of two input operands is held. |
| Operation (303) | OPR | Latches bits 30-25, 17-16, and 8 of the instruction when bit 31 = 0 and bits 30-28 are not all 0 or they are all 0 and bits 27-25 are 100, 011, or 111. |
| Branch true flip-flop (309) | BTFF | Is set when the comparison according to bits 30-28 and 26 is true; otherwise it is cleared. Its output is sent to the BT flag in the control unit. |
| Source operand A (304) | AR | Holds the first operand when there are two input operands. |
| Minimum (307) | MINR | Retains the smaller value determined by a compare. |
| Maximum (308) | MAXR | Retains the larger value determined by a compare. |
| Compare output (302) | CPOR | Where maximum and minimum values are disassembled for transmission to the Central Memory 70. |

The execution of a compare instruction begines with the C Processor latching bits 30-25, 17-16, and 8 into its Operation Register (OPR) 303. For compare instructions the operands can be byte, halfword, word, or doubleword integers or single or double precision floating point numbers, except immediate operands must be bytes and, when finding a minimum or maximum value, the operands must be halfwords, words, or doublewords. Both operands in a comparison must be the same length and type. The length for the comparison operands is dictated by bits 27 and 17-16. For 4- and 8-byte operands bit 8 is 0 if they are to be treated as integers and 1 if floating point numbers ar to be assumed.

When a compare/branch instruction is executed, the first source operand is assembled into the Compare Input Register (CPIR) 301 and then transferred to the AR 304. Then the second source operand is assembled into CPIR 301 and compared with the first. If the branch condition specified by bits 30-28 and 26 is satisfied, then the branch true flip-flop (BTFF) is set; otherwise the BTFF is cleared. The BTFF's output is sent to the Control Unit 30 where it is used to set the BT flag in the FW 33. Also, the larger of the two operands is put in the Maximum Register (MAXR) 308 and the smaller is put in the Minimum Register (MINR) 307. If they are the same, the common value is put in both MAXR 308 and MINR 307.

The minimum instruction simply transfers the contents of MINR 307 to the Compare Output Register (CPOR) 302 where it is disassembled and transmitted to location c in the Central Memory 70. The maximum instruction is similar except that the transfer is from the MAXR 308.

The compare-update instruction compares a single input operand with MINR 307 and MAXR 308. If this operand is smaller than the contents of MINR 307 then it is put in MINR 307, and if it is larger than the contents of MAXR then it is put in MAXR 308. An assembler language sequence for finding the minimum and maximum of a linear array of N single precision floating point numbers beginning at W and putting the minimum and maximum values into X and Y, respectively, is:

|          | MV1B | W + 8, 10H              |
|----------|------|-------------------------|
|          | CBCS | EQ, W, W + 4, CONTINUE  |
| CONTINUE | MRTI | N − 2                   |
|          | CUPS | 10H                     |
|          | MINS | X                       |
|          | MAXS | Y                       |

Location 10H (hexadecimal) which autoincrements after each access is used for addressing the array. The last five instructions, which determine the minimum and maximum values, require only N+2 Central Memory 70 accesses.

A reset clears all registers and the BTFF.

LOGICAL PROCESSOR (L) 400

Figure 7:
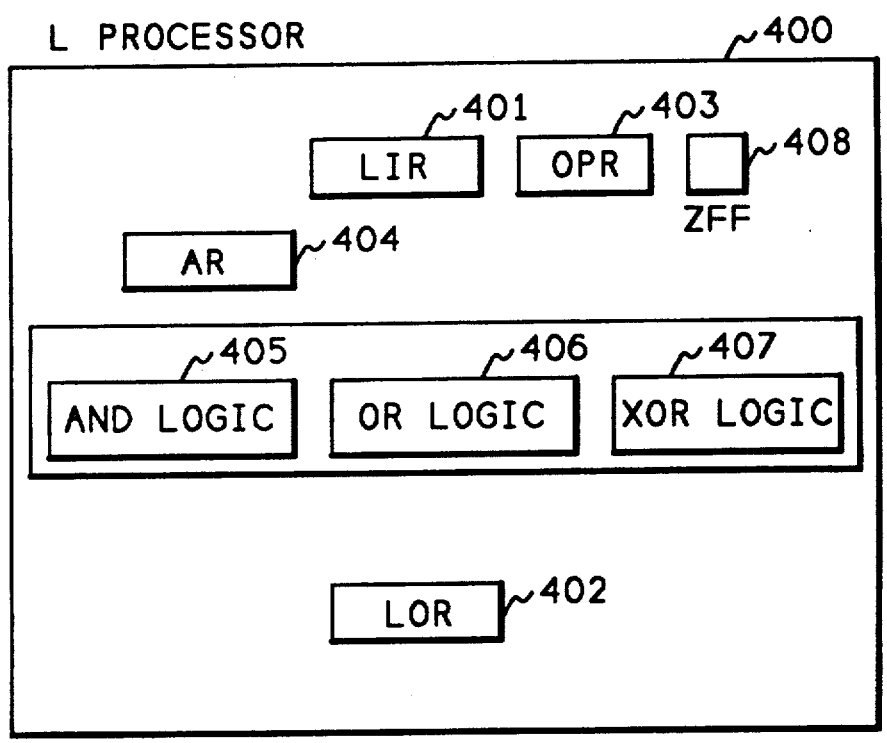
FIG. 7 shows the major components of the logical processor.

The identifying bits for the Logical (L) Processor 400 are 1001. The L Processor's instruction set is defined in TABLE 4 and its principal registers are shown in FIG. 7 and are defined as follows:

| Name (number) | Abbr. | Definition |
|---------------|-------|------------|
| Logical input (401) | LIR | Where the operands are received and assembled and for holding the second source operand. |
| Operation (403) | OPR | Latches bits 27-25 and 1-0 when bits 31-28 are 1001. |
| Zero flip-flop (408) | ZFF | Is set when a zero result occurs; otherwise, it is cleared. It is sent to the zero flag in the control unit. |
| Source operand A (404) | AR | Holds the first source operand. |
| Logical output (402) | LOR | Where the result is put while it is disassembled and transmitted to the Central Memory 70. |

The logical processor is capable of ANDing, ORing, or exclusive ORing bytes, halfwords, words, or doublewords. One of the operands can be immediate but, if it is, the operands can only be bytes or halfwords. Both source operands and the result must be of the same length. When a logical instruction is executed, bits 27-25 and 1-0 are latched into the OPR 403. The first source operand is assembled into the Logical Input Register (LIR) 401 and then transferred to the AR 404. Then the second source operand is assembled into the LIR 401, the logical operation is performed, and the result is put in the Logical Output Register (LOR) 402, disassembled, and sent to the Central Memory 70. If the result is zero the Zero Flip-flop (ZFF) 408 is set; otherwise the ZFF 408 is cleared. The output of the ZFF 408 is sent to the Control Unit 30 where it determines the state of the zero flag in the FW 33.

Bits 27 and 1-0 determine the length of the operands. Bits 26-25 are 00 for AND, 01 for OR, and 10 for XOR. The logical operations are performed by the AND logic 405, the OR logic 406, and the XOR logic 407. Bit 25 is 0 if the second operand is not immediate and 1 if it is immediate.

A reset clears all registers and the ZFF 408.

FLOATING POINT PROCESSOR (F) 500

Figure 8:
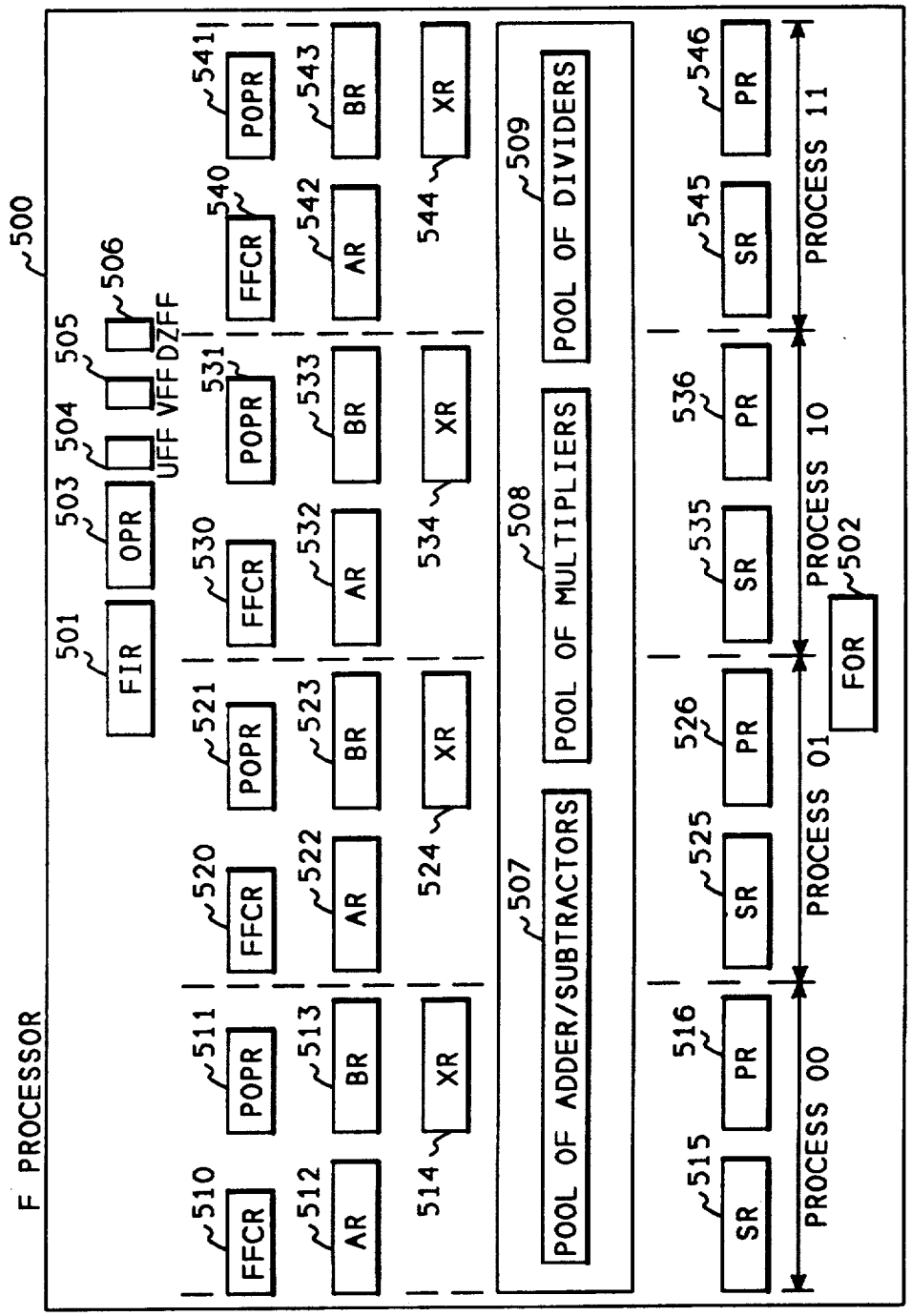
FIG. 8 shows the major components of the floating point processor.

The identifying bits for the Floating Point (F) Processor 500 are 1010 and its instructions are defined in TABLE 5 and TABLE 6. The F Processor 500 can operate on either single precision (32-bit) or double precision (64-bit) operands. The precision is determined by bit 1; it is 0 for single precision and 1 for double precision. The overall architecture of the F Processor 500 is shown in FIG. 8 and the definitions of its principal registers are as follows:

| Name (Number) | Abbr. | Definition |
|---------------|-------|------------|
| Floating point input (501) | FIR | Where source operands are assembled after reception. |
| Operation (503) | OPR | Latches bits 27-24, 17-16, 9-8, and 1-0 of the instruction when bits 31-28 are 1010. |
| Exp. underflow flip-flop (504) | UFF | Set when an underflow occurs and is reset is by the next operation in the same process the that set it. It is sent to the exponent underflow flag in the Control Unit 30. |
| Exp. overflow flip-flop (505) | VFF | Set when an overflow occurs and is reset by the next operation in the same process that set it. It is sent to the exponent overflow flag in the Control Unit 30. |
| Divide by 0 flip-flop (506) | DZFF | Set when a zero divisor is detected and is reset by the next operation in the same process that set it. It is sent to the divide by zero flag in the Control Unit 30. |
| Process operation (511, 521, 531, 541) | POPR | Holds bits 27-24, 9-8, and 1-0 of the instruction while it is executed. |
| Floating point function code (510, 520, 530, 540) | FFCR | Holds the function code while a function is being evaluated. |
| Extra operand (514, 524, 534, 544) | XR | Holds an operand that is held constant or is used as a temporary register. |
| Source operand A (512, 523, 533, 543) | AR | Holds the operand or first of two operands. |
| Source operand B (513, 523, 533, 543) | BR | Holds the second operand. |
| Add/subtract result (515, 525, 535, 545) | SR | Receives the result of an add/subtract operation. |
| Multiply/divide result (516, 526, 536, 546) | PR | Receives the result of a multiply/divide/function operation. |
| Floating point output (502) | FOR | Where output results are disassembled before they are transmitted to the Central Memory 70. |

The F Processor 500 is such that it can handle four processes simultaneously. Each process may consist of a single addition, subtraction, multiplication, division, or function evaluation or a sequence of instructions. What takes place during a process is determined by the floating point instructions and the process type codes (t) which are included in them.

Each process has associated with it a set of process hardware, consisting of a Process Operation Register (POPR) which holds those instruction bits needed to complete the current instruction, a Floating Function Code Register (FFCR), an Extra Operand Register (XR), two source operand registers (AR and BR), and two result registers (SR for sum/difference results and PR for product/quotient/function results).

The arithmetic operations carried out during a process are performed by the pools of adder/subtracter 507, multiplier 508, and divider units 509. The selection of an available unit of the appropriate kind and the direction of the operands and results is done by the hardware surrounding these pools.

The function codes and process type codes are defined along with the instruction set in TABLE 6. A constant function has no source operand, its result is simply the value of the constant. All other functions have one source operand.

If a process is not in progress, it will begin with the first floating point instruction that is directed to it by its process number (bits 17-16 of the instruction). It will end with the first instruction that sends its result to a destination address in the Central Memory 70 (an instruction with bit 27=1). At the end of a process, SR is cleared to zero and PR is set to one. Each instruction in a process contains a process type code (bits 9, 8, and 0 of the instruction) which indicates to the F Processor 500:

(1) The number of operands it is to receive.
(2) Which registers (AR, BR, and XR) are to provide the source operands.
(3) What operation(s) are to be performed.

The purpose of having processes is to reduce the number of instructions and Central Memory 70 accesses needed to carry out a patterned computation.

For example, it is seen from the symbolic definition in TABLE 6 that an add instruction with bit 27=0, the process number 01, and the process type code 001 would cause two operands to be received from the Central Memory 70 and put in AR 522 and BR 523. They would then be multiplied and the result would be added to SR 525, with this result being left in SR 525 (i.e., not being transmitted to the Central Memory 70). A sequence of these instructions would cause an inner product to be accumulated in the SR 525. A final add instruction with bit 27=1 and a type code of 001 would cause the last product to be computed and added to SR 525, the inner product to be transmitted to a destination in the Central Memory 70, the SR 525 to be cleared, the PR 526 to be set to one, and the process to end. A typical assembler language sequence for taking the single precision inner product of two vectors X and Y of length N using process 1 and putting the result in W is:

|      |              |
|------|--------------|
| MVIB | X, 10H       |
| MVIB | Y, 11H       |
| MRTI | N − 1, 0     |
| FANS | 10H, 11H, 1, IP |
| FADS | 10H, 11H, W, 1, IP |

Note that the actual computation of the inner product requires only three instructions and, more importantly, 2N+1 Central Memory 70 accesses.

Taking an inner product is computing a sum of products where each term contains two factors. The dual of this operation is computing a product of sums where each factor contains two terms. Such a computation could be made the same way as an inner product, except that the PS assembler indicator would be used instead of IP.

A sequence for using process 0 to evaluate a double precision polynomial of degree N whose variable is in location T and coefficients are the consecutive locations pointed to by location A (high order coefficient first) is:

|      |          |
|------|----------|
| FFNF | T, 80H, 0 |
| MVIB | A, 10H   |
| MRTI | N, 0     |

|        | -continued |
|--------|------------|
| FANF   | 10H, 0, PE |
| FADF   | 10H, Y, 0, PE | where Y is the location of the result. The polynomial evaluation part of this sequence requires only N+2 Central Memory 70 accesses.

An arbitrary single precision sum of products/quotients expression could be evaluated by using FMNS and FDNS instructions with assembler indicators of AP to form a term, and then using FANS instructions and an FADS instruction with assembler indicators of SE to sum the terms. A single precision sum of squares could be found by successive FANS instructions and an FADS instruction, all having an assembler indicator of A2.

The F Processor 500 latches the instruction bits which are needed to complete the instruction into the Operation Register (OPR) 503. The operands are received and assembled into the Floating Point Input Register (FIR) 501 and then passed on to the FFCR, AR, BR, or XR according to bit 24 and the process type code (t bits) in the instruction. Results that are to be output are taken from the process's SR or PR, according to the type of the instruction, and put in the Floating Point Output Register (FOR) 502. From there they are disassembled and transmitted to the Central Memory 70.

Any exponent underflow, exponent overflow, or divide by zero by any process will cause the Underflow Flip-flop (UFF) 504, Overflow Flip-flop (VFF) 505, or Divide by Zero Flip-flop (DZFF) 506, respectively, to be set. It will remain set until the next operation in the same process, at which time it will be cleared and then set or cleared according to that operation. The outputs of these flip-flops are passed to the control unit where they determine the settings of the exponent underflow, exponent overflow, and divide by zero flags in the FW 33. When an underflow occurs the result is set to 0 and when an overflow occurs the result is set to the largest possible value. If a divisor is zero, the division is not done.

A reset causes all registers except the PRs to be cleared, and the PRs to be set to floating point 1. The UFF 504, VFF 505, and DZFF 506 are also cleared.

SHIFT/ROTATE PROCESSOR (S) 600

Figure 9:
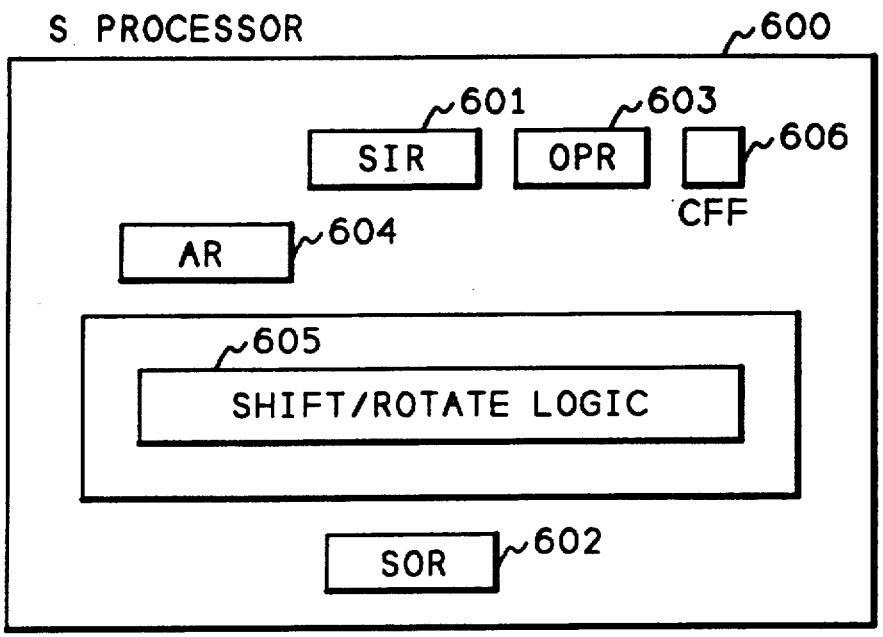
FIG. 9 shows the major components of the shift/rotate processor.

The identifying bits for the Shift/rotate (S) Processor 600 are 1011. The instruction set for the S Processor 600 is given in TABLE 7 and the principal registers are shown in FIG. 9 and defined as follows:

| Name (number) | Abbr. | Definition |
|---------------|-------|------------|
| Shift/rotate input (601) | SIR | Where input operands are assembled and holds the second operand. |
| Operation (603) | OPR | Latches bits 27-25 and 1-0 when bits 31-28 are 1011. |
| Carry flip-flop (606) | CFF | For shifts, it is set to the last bit shifted out. For left rotates not through carry it equals the least significant bit and for right rotates not through carry it equals the most significant bit. |
| Source operand A (604) | AR | Holds the first operand. |
| Shift/rotate output (602) | SOR | Where the result is disassembled for transmission to the Central |

| Name (number) | Abbr. | Definition |
|---|---|---|
| | | Memory 70. |

The S Processor can shift or rotate the bits in bytes, halfwords, words or doublewords. There are two source operands; the first is the operand to be shifted or rotated and the second is an immediate operand that indicates whether the shift or rotate is to the left or right and by how many bits. The first source and the destination operands are the same length.

A shift may be logical or arithmetic and to the left or to the right. A logical right shift inserts 0s on the left while an arithmetic right shift extends the sign (i.e., the most significant bit) as the shifting proceeds. For left shifts, there is no difference between logical and arithmetic shifts. For all shifts, the last bit shifted out is put in the Carry Flip-flop (CFF) 606. A rotate may or may not be through the CFF 606. If it is not through the CFF 606 then, after the rotate, the CFF 606 will be equal to the least significant bit for a left rotate and the most significant bit for a right rotate. After the shift or rotate, the output of the CFF 606 is sent to the Control Unit 30 where it determines the setting of the carry flag in the FW 33.

As usual, bits 27 and 1-0 indicate the length of the operands. Bit 26 is 0 for shifts and 1 for rotates. For shifts, bit 25 indicates a logical shift if it is 0 and an arithmetic shift if it is 1. For rotates, bit 25 indicates whether the rotate is not through carry (0) or through carry (1). Bit 24 is always 1 since the second operand is always immediate. Bit 15 is 0 for left shifts and 1 for right shifts and bits 13 through 8 specify the amount of the shift.

Bits 27-25 and 1-0 are latched into the Operation Register (OPR) 603 and the operand to be shifted is assembled into the Shift/rotate Input Register (SIR) 601 and then transferred to the AR 604. Then the second (immediate) operand is put into the SIR 601. After the shift or rotate by the Shift/rotate Logic 605, the result is put in the Shift/rotate Output Register (SOR) 602 where it is disassembled and sent to the Central Memory 70. Also CFF is sent to the carry flag in the FW 33 in the Control Unit 30.

A reset causes all registers and the CFF 606 to be cleared.

ADD/SUBTRACT PROCESSOR (A) 700

Figure 10:
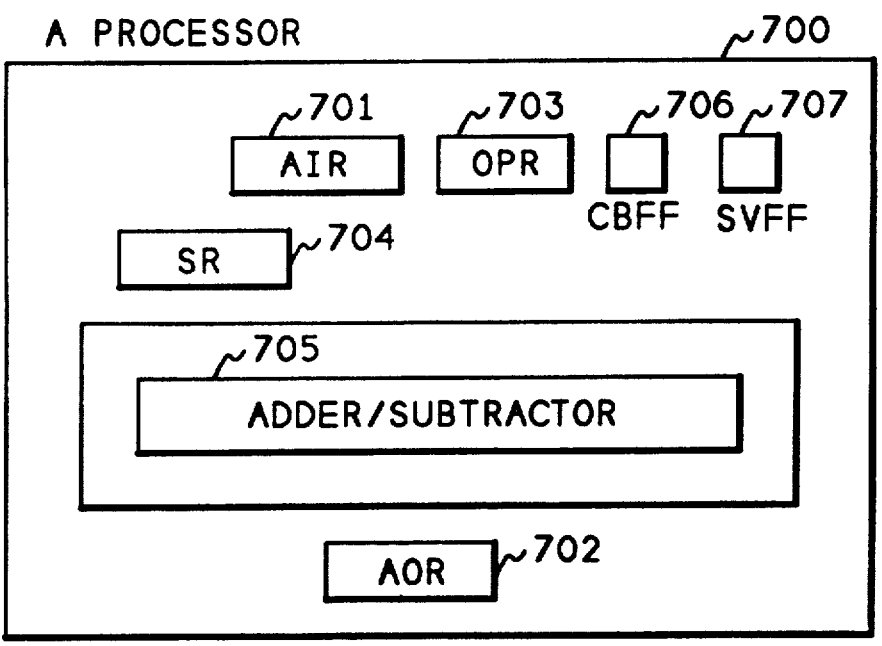
FIG. 10 shows the major components of the add/subtract processor.

The identifying bits for the Add/subtract (A) Processor 700 are 1100 and its instructions are defined in TABLE 8. The A Processor can perform addition or subtraction of two operands or do sum-add or sum-subtract operations. A series of sum-adds successively adds single operands as they are input and sum-subtracts successively subtract single operands from the first operand in a series. The principal registers for the A Processor 700 are shown in FIG. 10 and are defined as follows:

| Name (number) | Abbr. | Definition |
|---|---|---|
| Add/subtract input (701) | AIR | Where input operands are assembled and one of the operands is held during the computation. |
| Operation (703) | OPR | Latches bits 27-25, 16, 8, and 1-0 of the instruction when bits 31-28 are 1100. |
| Source operand A | SR | Holds one of the operands, which |

| Name (number) | Abbr. | Definition |
|---|---|---|
| or result (704) | | may be the first operand or the result of the previous operation. |
| Carry/borrow flip-flop (706) | CBFF | Holds the carry/borrow after an add/subtract is performed. |
| Signed overflow flip-flop (707) | SVFF | Cleared or set depending on whether or not a signed overflow has occurred. It is sent to the signed overflow flag in the Control Unit 30. |
| Add/subtract output (702) | AOR | Where the result is put to be disassembled and transmitted to the Central Memory 70. |

The A Processor has three principal registers; the Add/subtract Input Register (AIR) 701 for assembling operands as they are received and holding the received operand, if there is only one, or the second of two operands; the SR 704 register for holding the first operand during an addition or subtraction or the result during sum-add or sum-subtract operations; and the Add/subtract Output Register (AOR) 702 for holding results as they are disassembled for output to the Central Memory 70. All operations that return their results to the Central Memory 70 clear the SR 704. In addition, the A Processor contains a Carry/borrow Flip-flop (CBFF) 706, which retains the carry after any addition or borrow after any subtraction, and a Signed Overflow Flip-flop (SVFF) 707, which is set by any signed overflow and is cleared when an operation does not result in such an overflow. The SVFF 707 output is sent to the FW 33 in the Control Unit 30 and determines the setting of the signed overflow flag.

Additions and subtractions can be performed on bytes, halfwords, words, or doublewords and the second operand may be immediate. They may be performed with or without carry/borrow and always return their results to the Central Memory 70. All operands must be of the same length. The additions and subtractions are performed by the adder/subtracter 705.

Sum-adds and sum-subtracts can only be done without carry/borrow and only on halfwords, words, and doublewords. As with additions and subtractions, all operands in sum-add or sum-subtract computations must be of the same length. The sum-add is for summing a set of numbers. This is accomplished by adding all but the last number using sum-add instructions that put the result in SR, but not the Central Memory 70, and then adding the last number using a sum-add instruction that puts the result in the Central Memory 70. To subtract N−1 numbers from a first number, a sum-add would be executed first. This would be followed by N−2 sum-subtracts that do not send the result to the Central Memory 70 and then a subtract that puts the result in the Central Memory 70 would be executed. An assembler language sequence for performing a sum-subtract operation on N words beginning at X and putting the result in W is:

| | |
|---|---|
| MVIB | X, 10H |
| SANW | 10H |
| MRTI | N − 2, 0 |
| SSNW | 10H |
| SSDW | 10H, W |

The total number of Central Memory 70 accesses involved in executing the last four instructions is N+1.

As usual bit 27 indicates whether or not the operation is on bytes and bit 24 indicates whether or not the second operand is immediate. Bit 26 is 0 if the carry/borrow is not included in the operation and is 1 if it is included. Bit 25 is 0 for an addition or sum-add and 1 for a subtraction or sum-subtract. Bit 8 is 0 for additions and subtractions on halfwords, words, and doublewords and is 1 for sum-adds and sum-subtracts. For sum-adds and sum-subtracts, bit 16 is 0 if the result is not to be sent to the Central Memory 70 and is 1 if it is to be sent.

A reset clears all registers and the CBFF 706 and SVFF 707.

MULTIPLY/DIVIDE PROCESSOR (M) 800

Figure 11:
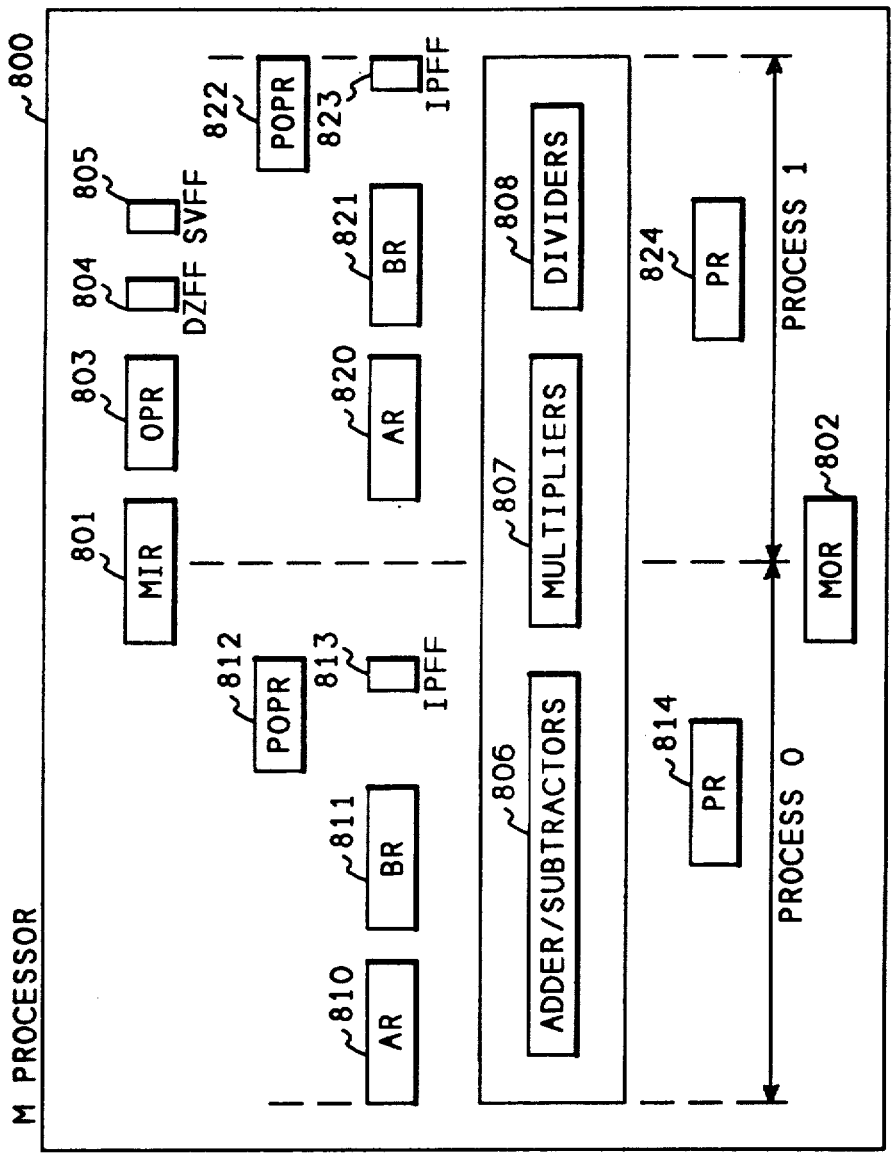
FIG. 11 shows the major components of the multiply/divide processor.

The identifying bits for the Multiply/divide (M) Processor 800 are 1101 and its instructions are defined in TABLE 9. The overall architecture of the M Processor 800 is shown in FIG. 11 and the definitions of its principal registers are as follows:

| Name (number) | Abbr. | Definition |
| --- | --- | --- |
| Multiply/divide input (801) | MIR | Where source operands are assembled after reception. |
| Operation (803) | OPR | Latches bits 27-25, 16, 8, and 1-0 when bits 31-28 are 1101. |
| Divide by 0 flip-flop (804) | DZFF | Set when a zero divisor is detected and is reset by the next operation in the process that set it. It is sent to the divide by zero flag in the Control Unit 30. |
| Signed overflow flip-flop (805) | SVFF | Set when a signed overflow occurs and is reset by the next operation in the process that set it. It is sent to the signed overflow flag in the Control Unit 30. |
| Process operation (812, 822) | POPR | Holds bits 27-25, 8, and 1-0 of the instruction while it is executed. |
| Source operand A (810, 820) | AR | Holds the operand or first of two operands. |
| Source operand B (811, 821) | BR | Holds the second operand. |
| Multiply/divide result (814, 824) | PR | Receives the result. |
| Inner product flip-flop (813, 823) | IPFF | Set by a multiply instruction when the operands are halfwords, words, or doublewords; there is not an immediate operand; and bit 8 = 0. It is cleared by a not immediate multiply instruction with bit 8 = 1. |
| Multiply/divide output (802) | MOR | Where output results are disassembled before they are transmitted to the Central Memory 70. |

The M Processor 800 is such that it can handle two processes simultaneously. Each process may consist of a single multiply or divide or, for halfword, word, or doubleword operations not involving immediate operands, a sequence of instructions for computing an inner product. Dividing and computing an inner product cannot be done using bytes, but can be done using halfwords, words, or doublewords. Multiplication can be performed using all four lengths of operands. All operations are such that the source operands and the result must all be the same length. As usual, this common length is determined by bits 27 and 1-0.

All multiply and divide operations may be signed or unsigned as determined by bit 26, which is 0 for unsigned operations and 1 for signed operations. Bit 25 distinguishes between multiply (0) and divide (1). As usual, bit 24 = 1 means the second operand is immediate. Immediate operands can only be bytes or halfwords. Bits 27-25, 8, and 1-0 of the instruction are held in the Process Operation Register (POPR) (812,822) while the instruction is executed.

The multiplication of bytes is always done by process 0 and for all other operations the process number is indicated by bit 16. For multiplication or division, the source operands are put in the AR and BR of the appropriate process. After the operation is complete the result is put in the PR. For division, the divisor is the second operand. The result is divided into halves with the lower half being the quotient and the upper half being the remainder.

An inner product computation begins when a multiply instruction is performed on halfwords, words, or doublewords, there is not an immediate operand, and bit 8=0. This instruction causes the inner product flip-flop (IPFF) to be set. This and all succeeding such not immediate multiply instructions with bit 8=0 cause the source operands to be multiplied and then added to the previous contents of the PR. The result of the addition is put in the PR, but is not sent to the Central Memory 70. Thus, a sequence of such instructions accumulates the inner product in the PR. The first not immediate multiply in the process with bit 8=1 causes the same action, except that it sends the final result to the Central Memory 70 and clears the PR and IPFF, thereby ending the inner product computation. An assembler language sequence that uses process 1 to take the inner product of two halfword vectors X and Y of length N and puts the result into W is:

| | |
| --- | --- |
| MVIB | X, 10H |
| MVIB | Y, 11H |
| MRTI | N − 1, 0 |
| IPNH | 10H, 11H, 1 |
| IPDH | 10H ,11H, W, 1 |

Note that the instructions for actually evaluating and storing the inner product require only 2N+1 Central Memory 70 accesses.

Bits 27-25, 16, 8, and 1-0 of the instruction are latched into the Operation Register (OPR) 803 when bits 31-28 of the instruction are 1101. The Multiply/divide Input Register (MIR) 801 receives and assembles the operands and the Multiply/divide Output Register (MOR) 802 holds the results while they are disassembled and sent to the Central Memory 70. The operations are carried out by the adder/subtracters 806, multipliers 807, and dividers 808.

The Signed Overflow Flip-flop (SVFF) 805 is set by signed overflows anytime they occur. The SVFF is reset and then set according to the next operation in the same process when this next operation is executed. If a divisor is 0, then the Divide by Zero Flip-flop (DZFF) 804 is set and the division is not done. Like the SVFF 805, the DZFF 804 is cleared, and perhaps set again, when the next operation in the same process is executed. The SVFF 805 and DZFF 804 outputs are sent to the FW 33 in the Control Unit 30 where they determine the settings of the signed overflow and divide by zero flags, respectively.

A reset causes all registers and flip-flops to be cleared.

NEGATE/COMPLEMENT/MOVE PROCESSOR (N) 900

Figure 12:
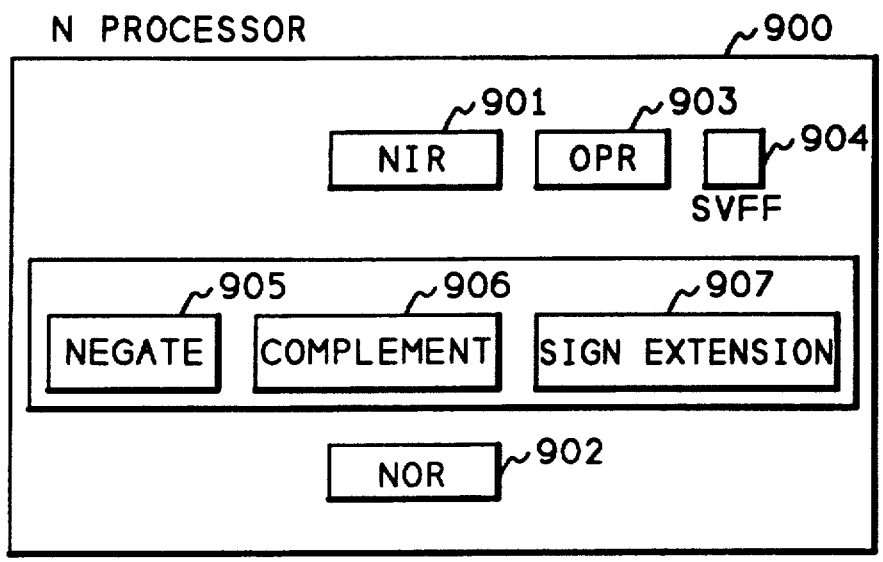
FIG. 12 shows the major components of the negate/complement/move processor.

The identifying bits for the Negate/complement/move (N) Processor 900 are 1110. The instruction set for the N Processor is defined in TABLE 10 and its principal registers are shown in FIG. 12 and are defined as follows:

| Name (number) | Abbr. | Definition |
| --- | --- | --- |
| Negate/comp./ move input (901) | NIR | Where input operands are assembled after reception. |
| Operation (903) | OPR | Latches bits 27-25, 16, and 1-0 when bits 31-28 are 1110. |
| Signed overflow flip-flop (904) | SVFF | Set when a negate causes a signed overflow and reset by next negate. It is sent to the signed overflow flag in the Control Unit 30. |
| Negate/compare/ move output (902) | NOR | Where results are disassembled for transmission to the Central Memory 70. |

All N Processor instructions involve one source operand and one destination operand. Both operands must be of the same length. Move/repeat instructions can have only byte operands, and moves with sign extension can have only halfword, word, and doubleword operands and can not be immediate. All other instructions can operate on operands of all four of the possible lengths. The first operand of a move/repeat or move instruction may be immediate. Negate instructions may operate on single or double precision floating point numbers.

Bits 27-24, 16, and 1-0 of the instruction are latched into the OPR 903. The input operands are assembled into the Negate/complement/move Input Register (NIR) 901, and the result is put in the Negate/complement/move Output Register (NOR) 902 where it is disassembled for transmission to the Central Memory 70. The operations are performed by the negate logic 905, complement logic 906, and sign extension logic 907.

A negate causes the 2's complement of an integer to be taken and the sign bit of a floating point number to be changed. A complement causes a 1's complement to be taken. If the negation of an integer causes a signed overflow, then the Signed Overflow Flip-flop (SVFF) 904 is set. The SVFF remains set until the next negate instruction is executed. Its output is sent to the FW 33 in the Control Unit 30 where it determines the setting of the signed overflow flag.

A move/repeat instruction is the same as a move byte instruction, except that it also sets the repeat flip-flop in the Control Unit 30 and the destination must be Central Memory 70 location 00. The instruction following the move/repeat instruction will be executed until location 00 decrements to 0. Moves with sign extensions cause the most significant bit in the lower half of the source operand to be extended through the upper half.

As usual, bits 27 and 1-0 determine the length of the operands and bit 24 determines whether or not the source operand is immediate. Bits 26-25 are 10 for negates, 00 for complements, and 01 or 11 for moves and 11 for move/repeats.

A reset causes all registers and flip-flops to be cleared.

INPUT/OUTPUT PROCESSOR (I/O) 200

Figure 13:
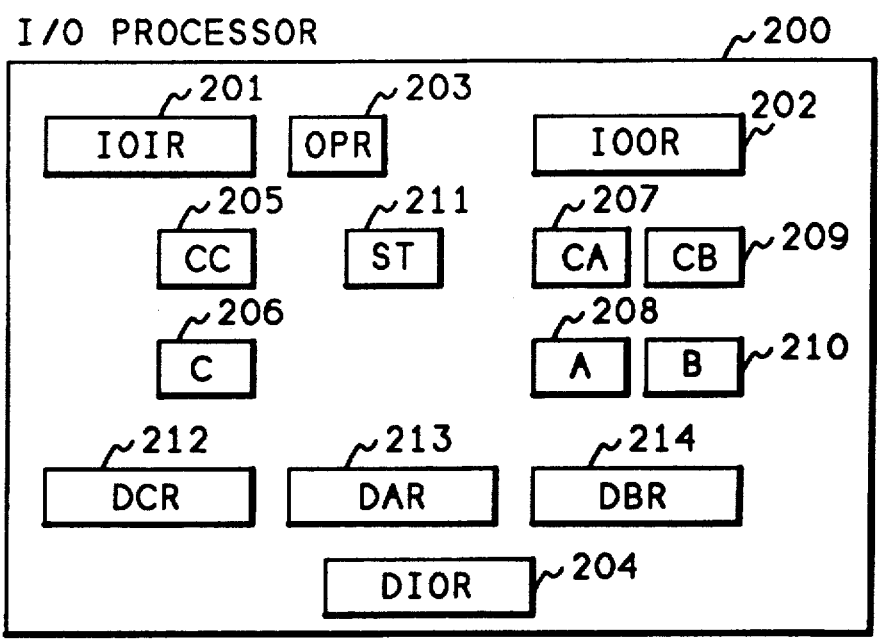
FIG. 13 shows the major components of the I/O processor.

The identifying bits for the Input/output (I/O) Processor 200 are 1111. The purpose of the I/O Processor is to load data into the Central Memory 70 from the external data memory or to store data from the Central Memory 70 into the external data memory. The capacity of the external data memory is 64K bytes and it is connected to the I/O Processor by the 64-bit bus PB 14. The instructions for the I/O Processor 200 are given in TABLE 11. Its registers are shown in FIG. 13 are and defined as follows:

| Name (number) | Abbr. | Definition |
| --- | --- | --- |
| I/O input (201) | IOIR | Where source operands are assembled after reception. |
| Operation (203) | OPR | Latches bits 27-25, 17-16, 9-8, and 1-0 when bits 31-28 are 1111. |
| I/O output (202) | IOOR | Where operands are disassembled for transmission to the Central Memory 70. |
| Status (211) | ST | Holds the current status that controls the type of I/O being performed. |
| Count A (207) | CA | Count associated with data-in channel A. |
| Count B (209) | CB | Count associated with data-in channel B. |
| Count C (205) | CC | Count associated with data-out channel C. |
| Data-in A register (213) | DAR | Holds data being input through channel A. |
| Data-in B register (214) | DBR | Holds data being input through channel B. |
| Data-out C register (212) | DCR | Holds data being output through channel C. |
| Data-in address A (208) | A | Holds the external data memory address for loading data through input channel A. |
| Data-in address B (210) | B | Holds the external data memory address for loading data through input channel B. |
| Data-out address C (206) | C | Holds the external data memory address for data being stored through output channel C. |
| Data I/O (204) | DIOR | Holds data that is to be output to the external data memory or has just been received from the external data memory. |

A store proceeds with the I/O Processor 200 receiving and assembling the data into its I/O Input Register (IOIR) 201. From there, the data is transferred to the Data-out C Register (DCR) 212 and then to the Data I/O Register (DIOR) 204 where it is put on the PB 14 along with the contents of the Data-out Address Register C (CR) 206.

There are two channels (A and B) for loading data. A load proceeds by applying the contents of the Data-in Address Register A (208) or B 210 to the PB 14 and waiting for the external data memory to return the data via the PB 14. When the data arrives it is latched into the DIOR 204 from which it is transferred to the Data-in A Register (DAR) 213 or Data-in B Register (DBR) 214 and then to the I/O output register (IOOR) 202 where it is disassembled and sent to the Central Memory 70.

There are four basic categories of I/O. They are:

Single datum, direct—the address register A 208, B 210, or C 206 is filled from an immediate operand and then the transfer is made to the destination.

Single datum, register indirect—same as the single datum direct case except that the A 208, B 210, or C 206 register is filled from a Central Memory 70 location.

Figure 14:
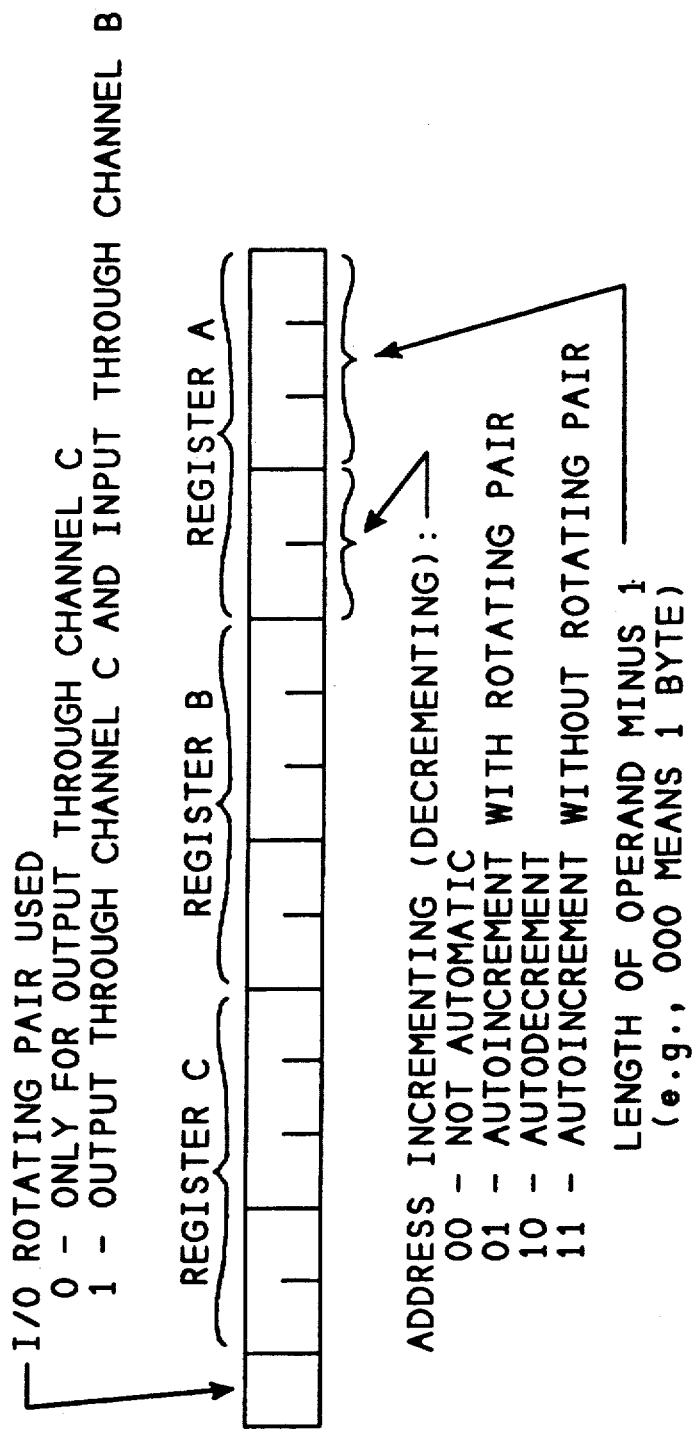
FIG. 14 shows the format of the I/O processor's status register.

Single datum, automatic—the source or destination Central Memory 70 address is a location that autoincrements or autodecrements after each access and the A 208, B 210, or C 206 address register in the I/O Processor automatically increments or decrements according to the contents of the status register ST 211. The format of the ST 211 is given in FIG. 14. The ST 211 must be set to indicate the operand length.

Block, autoincrement using a rotating pair—the source or destination address is provided by one of the Central Memory 70 locations in a rotating pair. This address autoincrements as does the contents of the A 208, B 210, or C 206 address register that provides the external data memory address. The increment amount is the operand length which is indicated by the contents of ST 211. Transfers are automatically made into the circular partition until the count register CA 207, CB 209, or CC 205, which decrements by 1 with each transfer, has reached 0.

The A 208, B 210, C 206, CA 207, CB 209, CC 205, or ST 211 register can be individually set using the STSH instruction and the CA 207, CB 209, CC 205, and ST 211 registers can be simultaneously set using the STSD instruction. The A 208, B 210, C 206, CA 207, CB 209, CC 205, or ST 211 register can be loaded into the Central Memory 70 with the LDRH instruction.

Locations 18 through 1F of the Central Memory 70 are used as rotating pairs with the even addressed locations being the input pointers and the odd addressed locations being the output pointers. Locations 18 and 19 are associated with input channel A, 1A and 1B with input channel B, and 1C and 1D with output channel C and, perhaps, input channel B. If bit 15 of the ST 211 register is 0 then locations 1C and 1D are used only for output through channel C; otherwise, they are used for both input through channel B and output through channel C. The remaining bits 14–0 of the ST 211 register are divided into three groups of five bits each. Bits 14–10 are associated with output channel C with bits 12–10 being the length minus 1 of the data being output and bits 14–13 indicating whether or not autoincrementing or autodecrementing of the A address register 208 is being used. These bits are 00 if neither autoincrementing nor autodecrementing is being used, 10 if autodecrementing is being used, and 01 or 11 if autoincrementing is being used. If these bits are 01 then output channel C is being used with its corresponding rotating pair. Similarly, bits 9–5 are associated with input channel B and bits 4–0 are associated with input channel A. Bits 7–5 and 2–0 indicate lengths and bits 9–8 and 4–3 indicate incrementing or decrementing and whether or not the rotating pair for the channel is being used.

Bits 27–24, 17–16, 9–8, and 1–0 are latched into the Operation Register (OPR) 203 whenever bits 31–28 are 1111. As usual, bits and 1–0 are for indicating operand lengths and bit 24 is for indicating an immediate operand. However, the source operand in a load instruction or the first source operand in a store instruction always supplies an external data memory address and is, therefore, a halfword. For store data instructions, the second operand is associated with the datum which may be any of the four lengths. Bit 26 specifies load (0) or store (1), except when bits 27–24 are 1111 the instruction is for loading an address or status register. Bit 25 indicates address register A (0) or B (1) for load instructions and address register C (0) or an address or status register (1) for store instructions.

A reset causes all registers to be cleared.

TABLE 1

Summary of processor characteristics.

| Processor | Symbol | PIF | Possible operand lengths in bytes in Input Bus 130 | No. of request/ grant circuits | No. of DARs |
|---|---|---|---|---|---|
| Compare | C | 0--- | 1, 2, 4, 8 | 1 | 1 |
| | | 1000 | Reserved for future instructions | | |
| Logical | L | 1001 | 1, 2, 4, 8 | 1 | 1 |
| Floating point | F | 1010 | 4, 8 | 4 | 4 |
| Shift/rotate | S | 1011 | 1, 2, 4, 8 | 1 | 1 |
| Add/subtract | A | 1100 | 1, 2, 4, 8 | 1 | 1 |
| Multiply/divide | M | 1101 | 1, 2, 4, 8 | 2 | 2 |
| Negate/comp./move | N | 1110 | 1, 2, 4, 8 | 1 | 1 |
| Input/output | I/O | 1111 | 1, 2, 4, 8 | 2 | 2 |

TABLE 2

Instructions that require no processor.
NO PROCESSOR USED (0)

| Name | Assembler code | Machine code | Definition |
|---|---|---|---|
| Instructions not executed by the Processing Element 19: | | | |
| Call | CALL d | 00000000010-----dddddddddddddddd | Call to d |
| Memory branch | ICMB d | 000000000-----dddddddddddddddd | Branch to d |
| Return | RTRN | 00000000100-------------------- | Return |
| Task complete | TSKC | 00000000001-------------------- | Task complete |
| Instructions executed by the Control Unit 30: | | | |
| No op* | NOOP | 00000000000-------------------- | No operation |
| Set flags+ | SETF x | 00000001xxxxxxxx--------------- | Sets flags |
| Clear flags+ | CLRF x | 00000010xxxxxxxx--------------- | Clears flags |
| Branch, conditional*: | | | |
| Outside, clear | BNOC x,d | 00000100xxxxxxxxddddddddddddddddd | To d, x clear |
| Outside, set | BNOS | 1100 | To d, x set |
| Inside, clear | BCIC | 01y1xxxxxxxx--------dddddddd | To d, x clear |
| Inside, set | BCIS | 11y1 | To d, x set |
| Branch, unconditional: | | | |
| Inside | BRIN d | 000010y1----------------dddddddd | Branch to d |

TABLE 2-continued

Instructions that require no processor.
NO PROCESSOR USED (0)

| Name | Assembler code | Machine code | Definition |
|---|---|---|---|
| Branch, loop**: | | | |
| Outside | LPOC a,d | 00001010-----aaaddddddddddddddddd | Loop to d, (a)=1 |
| Inside | LPIC | 00000011-----aaa--------dddddddd | |

*All prior instructions must complete execution before this instruction can complete its execution.
+For the set flags instruction a flag is set if a 1 appears in the flag's x bit and is otherwise unchanged. For the clear flags instruction a flag is cleared if a 0 appears in the flag's x bit and is otherwise unchanged.
**Register a must have an address 01 through 07. These registers autodecrement after outputting their contents. Looping continues until (a)=0.

Bit meanings for branch instructions:

| Bit | Meaning |
|---|---|
| 27 | Clear/set for conditional branches |
| 26 | Unconditional, loop/conditional |
| 25 | Forward/backward for inside branches |
| 24 | Outside/inside |

TABLE 3

Processor C 300 instructions.
PROCESSOR C (0)

| Name | Assembler code | Machine code | | | | Definition* |
|---|---|---|---|---|---|---|
| Minimum, maximum, and update instructions: | | | | | | |
| Min, half | MINH c | 00000110-------0-------0ccccccc- | | | | minr → c |
| Min, word | MINW | 0 | -01 | 0 | c-- | |
| Min, double | MIND | 0 | 011 | 0 | --- | |
| Min, single | MINS | 0 | -01 | 1 | c-- | |
| Min, double | MINF | 0 | 011 | 1 | --- | |
| Max, half | MAXH | 1 | --0 | 0 | cc- | maxr → c |
| Max, word | MAXW | 1 | -01 | 0 | c-- | |
| Max, double | MAXD | 1 | 011 | 0 | --- | |
| Max, single | MAXS | 1 | -01 | 1 | c-- | |
| Max, double | MAXF | 1 | 011 | 1 | --- | |
| Update, half | CUPH a | 00001000aaaaaaa0-------0-------- | | | | max of maxr |
| Update, word | CUPW a | | -01 | 0 | | and a → maxr |
| Update, double | CUPD a | | 011 | 0 | | min of minr |
| Update, single | CUPS a | | -01 | 1 | | and a → minr |
| Update, double | CUPF a | | 011 | 1 | | |
| Compare/branch**, immediate: | | | | | | |
| Byte, direct | CBDI r,a,i,d | 0rrr00y1aaaaaaaaiiiiiiiiddddddd | | | | a r i, to d |
| Byte, comp. | CBCI | 01y | | | | on condition |
| Compare/branch**, not immediate: | | | | | | |
| Byte, direct | CBDB r,a,b,d | 0rrr00y0aaaaaaaabbbbbbbbdddddddd | | | | a r b, |
| Byte, comp. | CBCB | 01y | | | | to d on |
| Half, direct | CBDH | 10y | aa0 | bb0 | | condition |
| Half, comp. | CBCH | 11y | | | | |
| Word, direct | CBDW | 10y | a01 | b-0 | | |
| Word, comp. | CBCW | 11y | | | | |
| Double, direct | CBDD | 10y | 011 | --0 | | |
| Double, comp. | CBCD | 11y | | | | |
| Single, direct | CBDS | 10y | a01 | b-1 | | |
| Single, comp. | CBCS | 11y | | | | |
| Double, direct | CBDF | 10y | 011 | --1 | | |
| Double, comp. | CBCF | 11y | | | | |

*In all definitions, a, b, or c refers to the contents of the location indicated by a, b, or c.
**If the condition specified by bits 30-28 and 26 is true then the BT flag in the Control Unit 30 is set. This flag is reset at the beginning of the execution of the next instruction.

Bit meanings for compare/branch instructions:

| Bit | Meaning |
|---|---|
| 27 | Byte/halfword, word, doubleword for compare/branch instructions and minimum/maximum for minimum and maximum instructions |
| 26 | Direct/complement for compare/branch instructions |
| 25 | Forward/backward for compare/branch instructions |
| 24 | Not immediate/immediate |
| 8 | Integer/floating point, except for immediate or byte compares |

TABLE 4

Processor L 400 instructions.
PROCESSOR L (1001)

| Name | Assembler code | Machine code | Definition |
|---|---|---|---|
| AND, immediate: | | | |
| Byte | ANIB a,i,c | 10010001aaaaaaaaiiiiiiiicccccccc | a i → c |

TABLE 4-continued

Processor L 400 instructions.
PROCESSOR L (1001)

| Name | Assembler code | Machine code | | | | Definition | |
|---|---|---|---|---|---|---|---|
| Half AND, not immediate: | ANIH i,c | 1 iiiiiiiiiiiiiiiicccccccc0 | | | | c | $i \to c$ |
| Byte | ANDB a,b,c | 10010000aaaaaaaabbbbbbbbcccccccc | | | | a | $b \to c$ |
| Half | ANDH | 1 | aa- | bb- | cc0 | | |
| Word | ANDW | 1 | a-- | b-- | c01 | | |
| Double | ANDD | 1 | --- | --- | 011 | | |
| OR, immediate: | | | | | | | |
| Byte | ORIB a,i,c | 10010011aaaaaaaaiiiiiiiicccccccc | | | | a V i | $\to c$ |
| Half | ORIH i,c | 1 iiiiiiiiiiiiiiiicccccccc0 | | | | c V i | $\to c$ |
| OR, not immediate: | | | | | | | |
| Byte | ORNB a,b,c | 10010010aaaaaaaabbbbbbbbcccccccc | | | | a V b | $\to c$ |
| Half | ORNH | 1 | aa- | bb- | cc0 | | |
| Word | ORNW | 1 | a-- | b-- | c01 | | |
| Double | ORND | 1 | --- | --- | 011 | | |
| XOR, immediate: | | | | | | | |
| Byte | XORB a,i,c | 10010101aaaaaaaaiiiiiiiicccccccc | | | | a | $i \to c$ |
| Half | XORH i,c | 1 iiiiiiiiiiiiiiiicccccccc0 | | | | c | $1 \to c$ |
| XOR, not immediate: | | | | | | | |
| Byte | XORB a,b,c | 10010100aaaaaaaabbbbbbbbcccccccc | | | | a | $b \to c$ |
| Half | XORH | 1 | aa- | bb- | cc0 | | |
| Word | XORW | 1 | a-- | b-- | c01 | | |
| Double | XORD | 1 | --- | --- | 011 | | |

Bit meanings:

| Bit(s) | Meaning |
|---|---|
| 27 | Byte/halfword, word, doubleword |
| 26-25 | AND (00)/OR (01)/XOR (10) |
| 24 | Not immediate/immediate |

TABLE 5

Processor F 500 instructions.
PROCESSOR F (1010)

| Name | Assembler Code | Machine Code | | |
|---|---|---|---|---|
| Floating add: | | | | |
| No dest., single | FANS a,b*,p,ai | 10100000aaaaaappbbbbbbbtt------0t | | |
| No dest., double | FANF | 0 | - | - -----01t |
| Dest., single | FADS a,b*,c,p,ai | 1 | a | b ccccccc0t |
| Dest., double | FADF | 1 | - | - ccccc01t |
| Floating subtract: | | | | |
| No dest., single | FSNS a,b*,p,ai | 10100010aaaaaappbbbbbbbtt------0t | | |
| No dest., double | FSNF | 0 | - | - -----01t |
| Dest., single | FSDS a,b*,c,p,ai | 1 | a | b ccccccc0t |
| Dest., double | FSDF | 1 | - | - ccccc01t |
| Floating multiply: | | | | |
| No dest., single | FMNS a,b*,p,ai | 10100100aaaaaappbbbbbbbtt------0t | | |
| No dest., double | FMNF | 0 | - | - -----01t |
| Dest., single | FMDS a,b*,c,p,ai | 1 | a | b ccccccc0t |
| Dest., double | FMDF | 1 | - | - ccccc01t |
| Floating divide: | | | | |
| No dest., single | FDNS a,b*,p,ai | 10100110aaaaaappbbbbbbbtt------0t | | |
| No dest., double | FDNF | 0 | - | - -----01t |
| Dest., single | FDDS a,b*,c,p,ai | 1 | a | b ccccccc0t |
| Dest., double | FDDF | 1 | - | - ccccc01t |
| Floating function: | | | | |
| No dest., single | FFNS a**,f,p | 10100001aaaaaappffffffff------01 | | |
| No dest., double | FFNF | 0 | - | -----011 |
| Dest., single | FFDS a**,f,c,p | 1 | a | cccccc01 |
| Dest., double | FFDF | 1 | - | ccccc011 |

*b is present only when ai is AB, IP, or PS
**When retrieving a constant, a is a don't care.

Bit meanings

| Bit(s) | Meaning |
|---|---|
| 27 | No Central Memory 70 destination/Central Memory 70 destination |
| 26-24 | Instruction type - addition (000)/subtraction (010)/multiplication (100)/division (110)/function (001) |
| 17,16 | Process number |
| 9,8,0 | Process type code |
| 1 | Single/double precision |

TABLE 6

Floating point function and process type codes.

Function code (indicated by the immediate operand - bits 15 through 8):

| Conversions: | | Constants (no input operand): | |
|---|---|---|---|
| Integer to floating point | | Zero | 00001000 |
| Halfword | 00000000 | One | 1001 |
| Word | 001 | Pi | 1010 |
| Doubleword | 010 | e | 1011 |
| | | ln 10 base e | 1101 |
| Floating point to integer: | | | |
| Halfword | 00000100 | Transcendental and other functions: | |
| Word | 101 | Fill XR register | 10000000 |
| Doubleword | 110 | Raise to power in XR | 00010000 |
| Floating point to floating point*: | | Ln base e | 010 |
| Single to double | 00000011 | Exponential | 011 |
| Double to single | 111 | Tangent | 100 |
| | | Tangent | 100 |
| | | Arctangent | 101 |
| | | Sine | 110 |
| | | Cosine | 111 |

*For floating point to floating point conversions, the precision of the source operand is determined by the function code. In all other cases, the precision of the floating point operands is determined by bit 1 of the instruction and the length of integer operands is determined by the function code.

Process type code:

Legend:
a - (AR)
b - (BR)
s - (SR)
p - (PR)
x - (XR)
c - (Central Memory 70 Location)

ai - assembler indicator

Instructions operating on two numbers (bit 0=0):

| Assembler indicator | Definition according to instruction type | | | Code - bits 9 8 |
|---|---|---|---|---|
| | Add/subtract | Multiply | Divide | |
| AB | a±b → s or c | ab → p or c | a/b → p or c | 0 0 |
| SA or PA | s±a → s or c | pa → p or c | p/a → p or c | 0 1 |
| AS or AP | a±s → s or c | ap → p or c | a/p → p or c | 1 0 |
| A2 or AX | s+a² → s or c | ax → p or c | a/x → p or c | 1 1 |

Instructions operating on three numbers (bit 0=1):

| Assembler indicator | Instruction type | Definition | Code - bits 9 8 | Primary purpose |
|---|---|---|---|---|
| IP | add/subtract | s±ab → s or c | 0 0 | Inner product |
| PS | add/subtract | (a±b)p → p or c | 0 1 | Product of sums |
| PE | add/subtract | sx±a → s or c | 1 0 | Polynomial evaluation |
| SE | add/subtract | s±ap → s or c | 1 1 | Series evaluation |

TABLE 7

Processor S 600 instructions.
PROCESSOR S (1011)

| Name | Assembler code | Machine code | | | Definition |
|---|---|---|---|---|---|
| Shift logical: | | | | | |
| Byte, left | SLLB a,s,c | 10110001aaaaaaaa0-ssssssccccccccc | | | a → c, |
| Byte, right | SLRB | 0 | aaa1 | ccc | shift with |
| Half, left | SLLH | 1 | aa-0 | cc0 | 0s inserted |
| Half, right | SLRH | 1 | aa-1 | cc0 | |
| Word, left | SLLW | 1 | a--0 | c01 | |
| Word, right | SLRW | 1 | a--1 | c01 | |
| Double, left | SLLD | 1 | ---0 | 011 | |
| Double, right | SLRD | 1 | ---1 | 011 | |
| Shift arithmetic: | | | | | |
| Byte, left | SALB a,s,c | 10110011aaaaaaaa0-ssssssccccccccc | | | a → c, |
| Byte, right | SARB | 0 | aaa1 | ccc | shift with |
| Half, left | SALH | 1 | aa-0 | cc0 | sign ext. |
| Half, right | SARH | 1 | aa-1 | cc0 | |
| Word, left | SALW | 1 | a--0 | c01 | |
| Word, right | SARW | 1 | a--1 | c01 | |
| Double, left | SALD | 1 | ---0 | 011 | |
| Double, right | SARD | 1 | ---1 | 011 | |
| Rotate not though carry: | | | | | |
| Byte, left | RNLB a,s,c | 10110101aaaaaaaa0-ssssssccccccccc | | | a → c, |
| Byte, right | RNRB | 0 | aaa1 | ccc | rotate not |
| Half, left | RNLH | 1 | aa-0 | cc0 | through |
| Half, right | RNRH | 1 | aa-1 | cc0 | carry |
| Word, left | RNLW | 1 | a--0 | c01 | |
| Word, right | RNRW | 1 | a--1 | c01 | |

TABLE 7-continued

Processor S 600 instructions.
PROCESSOR S (1011)

| Name | Assembler code | Machine code | | | Definition |
|---|---|---|---|---|---|
| Double, left | RNLD | 1 | ---0 | 011 | |
| Double, right | RNRD | 1 | ---1 | 011 | |
| Rotate through carry: | | | | | |
| Byte, left | RCLB a,s,c | 10110111aaaaaaaa0-sssssscccccccc | | | a → c, |
| Byte, right | RCRB | 0 | aaa1 | ccc | rotate |
| Half, left | RCLH | 1 | aa-0 | cc0 | through |
| Half, right | RCRH | 1 | aa-1 | cc0 | carry |
| Word, left | RCLW | 1 | a--0 | c01 | |
| Word, right | RCRW | 1 | a--1 | c01 | |
| Double, left | RCLD | 1 | ---0 | 011 | |
| Double, right | RCRD | 1 | ---1 | 011 | |

Bit meanings:

Bit  Meaning
27   Byte/halfword, word, doubleword
26   Shift/rotate
25   Logical/arithmetic for shifts and Not through carry/through carry for rotates
15   Left/right

TABLE 8

Processor A 700 instructions.
PROCESSOR A (1100)

| Name | Assembler code | Machine code | | | | Definition* |
|---|---|---|---|---|---|---|
| Add, immediate: | | | | | | |
| No carry, byte | AINB a,i,c | 11000001aaaaaaaaiiiiiiiicccccccc | | | | a + i → c |
| Carry, byte | AICB | 01 | | | | |
| No carry, half | AINH i,c | 10 | iiiiiiiiiiiiii | | cc0 | c + i → c |
| Carry, half | AICH | 11 | cc0 | | | |
| No carry, word | AINW | 10 | c01 | | | |
| Carry, word | AICW | 11 | c01 | | | |
| No carry, double | AIND | 10 | 011 | | | |
| Carry, double | AICD | 11 | 011 | | | |
| Add, not immediate: | | | | | | |
| No carry, byte | ADNB a,b,c | 11000000aaaaaaaabbbbbbbbcccccccc | | | | a + b → c |
| Carry, byte | ADCB | 01 | aaa | bbb | ccc | |
| No carry, half | ADNH | 10 | aa0 | bb- | cc0 | |
| Carry, half | ADCH | 11 | aa0 | bb- | cc0 | |
| No carry, word | ADNW | 10 | a-0 | b-- | c01 | |
| Carry, word | ADCW | 11 | a-0 | b-- | c01 | |
| No carry, double | ADND | 10 | --0 | --- | 011 | |
| Carry, double | ADCD | 11 | --0 | --- | 011 | |
| Subtract, immediate: | | | | | | |
| No borrow, byte | SINB a,i,c | 11000011aaaaaaaaiiiiiiiicccccccc | | | | a − i → c |
| Borrow, byte | SICB | 01 | | | | |
| No borrow, half | SINH i,c | 10 | iiiiiiiiiiiiiiicccccccc0 | | | c − i → c |
| Borrow, half | SICH | 11 | cc0 | | | |
| No borrow, word | SINW | 10 | cc0 | | | |
| Borrow, word | SICW | 11 | c01 | | | |
| No borrow, dble | SIND | 10 | 011 | | | |
| Borrow, double | SICD | 11 | 011 | | | |
| Subtract, not immediate: | | | | | | |
| No borrow, byte | SBNB a,b,c | 11000010aaaaaaaabbbbbbbbcccccccc | | | | a − b → c |
| Borrow, byte | SBCB | 01 | aaa | bbb | ccc | |
| No borrow, half | SBNH | 10 | aa0 | bb- | cc0 | |
| Borrow, half | SBCH | 11 | aa0 | bb- | cc0 | |
| No borrow, word | SBNW | 10 | a-0 | b-- | c01 | |
| Borrow, word | SBCW | 11 | a-0 | b-- | c01 | |
| No borrow, dble | SBND | 10 | --0 | --- | 011 | |
| Borrow, double | SBCD | 11 | --0 | --- | 011 | |
| Sum-add: | | | | | | |
| No dest., half | SANH a | 11001000aaaaaaa1-------0-------0 | | | | s + a → s |
| Dest., half | SADH a,c | aa1 | 1ccccccc0 | | | s + a → c |
| No dest., word | SANW a | a-1 | 0------01 | | | s + a → s |
| Dest., word | SADW a,c | a-1 | 1cccccc01 | | | s + a → c |
| No dest., double | SAND a | --1 | 0-----011 | | | s + a → s |
| Dest., double | SACD a,c | --1 | 1ccccc011 | | | s + a → c |
| Sum-subtract: | | | | | | |
| No dest., half | SSNH a | 11001010aaaaaaa1-------0-------0 | | | | s − a → s |
| Dest., half | SSDH a,c | aa1 | 1ccccccc0 | | | s − a → c |
| No dest., word | SSNW a | a-1 | 0------01 | | | s − a → s |
| Dest., word | SSDW a,c | a-1 | 1cccccc01 | | | s − a → c |
| No dest., double | SSND a | --1 | 0-----011 | | | s − a → s |

TABLE 8-continued

Processor A 700 instructions.
PROCESSOR A (1100)

| Name | Assembler code | Machine code | | Definition* |
|---|---|---|---|---|
| Dest., double | SSDD a,c | --1 | 1-----011 | s − a → c |

*The carry flag is added to the sum for add with carry instructions and is subtracted from the difference for subtract with borrow instructions. s represents SR 704. It is cleared by all operations that put the result in the Central Memory 70 (i.e., that has a destination of c).

Bit Meanings:

| Bit | Meaning |
|---|---|
| 27 | Byte/halfword, word, doubleword |
| 26 | No carry/carry or No borrow/borrow |
| 25 | Add/subtract or Sum-add/sum-subtract |
| 24 | Not immediate/immediate |
| 16 | Not sum-add-subtract/sum-add-subtract (only for halfword, word, or doubleword operands) |
| 8 | No Central Memory 70 destination/Central Memory 70 destination (only for sum-add and sum-subtract instructions) |

TABLE 9

Processor M 800 instructions.
PROCESSOR M (1101)

| Name | Assembler code | Machine code | | | | Definition |
|---|---|---|---|---|---|---|
| Multiply, immediate: | | | | | | |
| Unsigned, byte | MIUB a,i,c,0 | 11010001aaaaaaaaiiiiiiiicccccccc | | | | a*i → c |
| Signed, byte | MISB | 01 | | | | |
| Unsigned, half | MIUH i,c,p | 10 | iiiiiiiiiiiiiiiicccccccc0 | | | c*i → c |
| Signed, half | MISH | 11 | cc0 | | | |
| Unsigned, word | MIUW | 10 | c01 | | | |
| Signed, word | MISW | 11 | c01 | | | |
| Unsigned, double | MIUD | 10 | 011 | | | |
| Signed, double | MISD | 11 | 011 | | | |
| Multiply, not immediate: | | | | | | |
| Unsigned, byte | MUUB a,b,c,0 | 11010000aaaaaaaabbbbbbbbcccccccc | | | | a*b → c |
| Signed, byte | MUSB | 01 | | | | |
| Unsigned, half | MUUH a,b,c,p | 11011000aaaaaaapbbbbbbb1ccccccc0 | | | | |
| Signed, half | MUSH | 11 | aap | bb1 | cc0 | |
| Unsigned, word | MUUW | 10 | a-p | b-1 | c01 | |
| Signed, word | MUSW | 11 | a-p | b-1 | c01 | |
| Unsigned, double | MUUD | 10 | --p | --1 | 011 | |
| Signed, double | MUSD | 11 | --p | --1 | 011 | |
| Divide, immediate: | | | | | | |
| Unsigned, half | DIUH i,c,p | 110110111iiiiiiiiiiiiiiiiccccccc0 | | | | quo c/i → c |
| Signed, half | DISH | 11 | cc0 | | | rem c/i → c+L |
| Unsigned, word | DIUW | 10 | c01 | | | (L=half |
| Signed, word | DISW | 11 | c01 | | | length of |
| Unsigned, double | DIUD | 10 | 011 | | | operands) |
| Signed, double | DISD | 11 | 011 | | | |
| Divide, not immediate: | | | | | | |
| Unsigned, half | DVUH a,b,c,p | 11011010aaaaaaapbbbbbbb1ccccccc0 | | | | quo a/b → c |
| Signed, half | DVSH | 11 | aap | bb1 | --0 | rem a/b → c+L |
| Unsigned, word | DVUW | 10 | a-p | b-1 | -01 | (L=half |
| Signed, word | DVSW | 11 | a-p | b-1 | -01 | length of |
| Unsigned, double | DVUD | 10 | --p | --1 | 011 | operands) |
| Signed, double | DVSD | 11 | --p | --1 | 011 | |
| **Inner product*:** | | | | | | |
| No dest., half | IPNH a,b,p | 11011100aaaaaaapbbbbbbb0-------0 | | | | p + ab → p |
| Dest., half | IPDH a,b,c,p | aap | bb1ccccccc0 | | | p + ab → c |
| No dest., word | IPNW a,b,p | a-p | b-0-----01 | | | p + ab → p |
| Dest., word | IPDW a,b,c,p | a-p | b-1ccccccc01 | | | p + ab → c |
| No dest., double | IPND a,b,p | --p | --0-----011 | | | p + ab → p |
| Dest., double | IPDD a,b,c,p | --p | --1ccccc011 | | | p + ab → c |

*Multiplication with a Central Memory 70 destination is distinguished from an inner product with a Central Memory 70 destination by whether or not the IPFF is 0 (multiplication) or 1 (inner product). This flip-flop is set by non-destination inner products and cleared by destination inner products, which thereby end the inner product. p represents the PR, a register in the process. The PR register is cleared by all operations that put the result in the Central Memory 70.

Bit Meanings:

| Bit | Meaning |
|---|---|
| 27 | Byte/halfword, word, doubleword |
| 26 | Unsigned/signed |
| 25 | Multiply/divide |
| 24 | Not immediate/immediate |
| 16 | Process number |
| 8 | No Central Memory 70 destination/Central Memory 70 destination (only for not immediate halfword, word, and doubleword operands) |

TABLE 10

Processor N 900 instructions.
PROCESSOR N (1110)

| Name | Assembler code | Machine code | | | Definition |
|------|---------------|--------------|---|---|------------|
| Negate: | | | | | |
| Byte | NEGB a,c | 11100100aaaaaaaa--------cccccccc | | | a → c |
| Half | NEGH | 1 | aa- | cc0 | |
| Word | NEGW | 1 | a-0 | c01 | |
| Double | NEGD | 1 | --0 | 011 | |
| Single | NEGS | 1 | a-1 | c01 | |
| Double | NEGF | 1 | --1 | 011 | |
| Complement: | | | | | |
| Byte | CPLB a,c | 11100000aaaaaaaa--------cccccccc | | | a → c |
| Half | CPLH | 1 | aa- | cc0 | |
| Word | CPLW | 1 | a-- | c01 | |
| Double | CPLD | 1 | --- | 011 | |
| Move, immediate: | | | | | |
| Repeat* | MRTI i,c | 11100111--------iiiiiiii000ccccc | | | i → 0, set RFF |
| Byte | MVIB | 00 | cccccccc | | i → c |
| Half | MVIH | 10 | iiiiiiiiiiiiiiiicccccccc0 | | |
| Word | MVIW | 10 | c01 | | |
| Double | MVID | 10 | 011 | | |
| Move, not immediate: | | | | | |
| Repeat* | MRPT a,c | 11100110aaaaaaaa--------000ccccc | | | a → 0, set RFF |
| No extend, byte | MVNB | 00 | aaa | cccccccc | a → c |
| No extend, half | MVNH | 10 | aa- | cc0 | |
| Extend**, half | MVXH | 11 | aa- | cc0 | |
| No extend, word | MVNW | 10 | a-- | c01 | |
| Extend**, word | MVXW | 11 | a-- | c01 | |
| No extend, dble | MVND | 10 | --- | 011 | |
| Extend**, double | MVXD | 11 | --- | 011 | |

*Move/repeat instructions are the same as move byte instructions except that they do not cause destination indirect addressing, and if the destination is 0 then they also set the repeat flag in the Control Unit 30 so that the next instruction is repeated the number of times determined by the contents of location 00. Location 00 is tested before the execution of the repeated instruction and if it is 00 the RFF is cleared and the next instruction is executed; otherwise the repeated instruction is executed again.

**Extend means the most significant bit of the lower half of the operand is extended through the upper half. For MVID the extension is from the immediate halfword to a doubleword.

Bit meanings:

| Bit(s) | Meaning |
|--------|---------|
| 27 | Byte/halfword, word, doubleword |
| 26-25 | Negate (10)/complement (00)/move (01 or 11)/repeat (11) |
| 24 | Not immediate/immediate |
| 16 | Integer/floating point - for negate only |

TABLE 11

I/O Processor 200 instructions.
PROCESSOR I/O (1111)

| Name | Assembler code | Machine code | | | Definition |
|------|---------------|--------------|---|---|------------|
| Load, immediate: | | | | | |
| A, byte | LIAB i,c | 11110001iiiiiiiiiiiiiiiicccccccc | | | i → A; DI → c |
| B, byte | LIBB | 001 | | | i → B; DI → c |
| A, half | LIAH | 100 | iiiiiiiiiiiiiiiicccccccc0 | | i → A; DI → c |
| B, half | LIBH | 101 | cc0 | | i → B; DI → c |
| A, word | LIAW | 100 | c01 | | i → A; DI → c |
| B, word | LIBW | 101 | c01 | | i → B; DI → c |
| A, double | LIAD | 100 | 011 | | i → A; DI → c |
| B, double | LIBD | 101 | 011 | | i → B; DI → c |
| Load, not immediate: | | | | | |
| A, byte | LDAB a,c | 11110000aaaaaaaa-------0cccccccc | | | a → A; DI → c |
| B, byte | LDBB a,c | 001 | aaaaaaaa | 0 | a → B; DI → c |
| Auto, A, byte | LAAB c | 000 | -------- | 1 | Autoload* |
| Auto, B, byte | LABB c | 001 | 1 | | |
| A, half | LDAH a,c | 100 | aaaaaaa- | 0cccccccc0 | a → A; DI → c |
| B, half | LDBH a,c | 101 | aaaaaaa- | 0 | a → B; DI → c |
| Auto, A, half | LAAH c | 100 | -------- | 1 | Autoload* |
| Auto, B, half | LABH c | 101 | 1 | | |
| A, word | LDAW a,c | 100 | aaaaaa-- | 0cccccc01 | a → A; DI → c |
| B, word | LDBW a,c | 101 | aaaaaa-- | 0 | a → B; DI → c |
| Auto, A, word | LAAW c | 100 | -------- | 1 | Autoload* |
| Auto, B, word | LABW c | 101 | 1 | | |
| A, double | LDAD a,c | 100 | aaaaa--- | 0ccccc011 | a → A; DI → c |
| B, double | LDBD a,c | 101 | aaaaa--- | 0 | a → B; DI → c |
| Auto, A, dble | LAAD c | 100 | -------- | 1 | Autoload* |
| Auto, B, dble | LABD c | 101 | 1 | | |
| Store, immediate: | | | | | |
| C, byte | STCB i,c | 11110101iiiiiiiiiiiiiiiicccccccc | | | i → c; c → DO |
| C, half | STCH | 110 | cc0 | | |
| C, word | STCW | 110 | c01 | | |

TABLE 11-continued

I/O Processor 200 instructions.
PROCESSOR I/O (1111)

| Name | Assembler code | Machine code | | | Definition |
|---|---|---|---|---|---|
| C, double | STCD | 110 | | 011 | |
| Load register: | | | | | |
| Register, half | LDRH n,c | 11111111 | nn | n0ccccccc0 | A,B,C,CA,CB, CC, or ST → c according to n |
| Store, not immediate: | | | | | |
| C, byte | STCB a,c | 11110100aaaaaaaa | | 0ccccccc | a → C; c → DO |
| Auto, C, byte | SACB c | 010 | | 1 | Autostore* |
| C, half | STCH a,c | 110 | aaaaaaa | 0ccccccc0 | a → C; c → DO |
| Auto, C, half | SACH c | 110 | | 1 | Autostore* |
| C, word | STCW a,c | 110 | aaaaaa | 0ccccc01 | a → C; c → DO |
| Auto, C, word | SACW c | 110 | | 1 | Autostore* |
| C, double | STCD a,c | 110 | aaaaa | 0ccccc011 | a → C; c → DO |
| Auto, C, dble | SACD c | 110 | | 1 | Autostore* |
| Register, half | STSH n,c | 111 | nn | n0ccccccc0 | c → A,B,C,CA CB, CC, or ST according to n |
| Status, dble | STSD c | 111 | | 0ccccc011 | c → CA:CB:CC:ST |

*Autoload and autostore mean that c and/or A, B, or C are, after the load or store is executed, autoincremented or autodecremented depending on c and the contents of the status register ST. Autoloading/autostoring continues until the count in the CA, CB, or CC becomes 0.

Legend:
A = Data-in address register A
B = Data-in address register B
C = Data-out address register C
DIOR = Data-in/out buffer register
CA = Count register for channel A
CB = Count register for channel B
CC = Count register for channel C
ST = Status register Bit meanings:

| Bit(s) | Meaning |
|---|---|
| 27 | Byte/halfword, word doubleword |
| 26 | Load/store except 11111111 is for load register |
| 25 | Register A/register B for loads and Register C/address-status register(s) for stores |
| 24 | Not immediate/immediate |
| 17-16.9 | Register address: A (000)/B (001)/C (010)/CA (100)/CB (101)/CC (110)/ST (111) - for load and store register instructions only |
| 8 | Not automatic/automatic - for not immediate instructions only |

What is claimed is:

1. A processing element for a general purpose digital data processing system comprising:
   a control unit adapted to receive instructions and direct data flow within said processing element;
   first means for testing a selected bit within an instruction to determined if an operand of said instruction addresses a byte datum;
   second means responsive to said first means for testing a low order address bit or said operand to determine if said operand addresses a half-word datum whenever said first means determines that said operand does not address a byte datum; and
   third means responsive to said second means for testing a next low order address bit of said operand to determine if said operand addresses a word or double-word datum whenever said second means determines that said operand does not address a half-word datum.

* * * * *